United States Patent
Flanagan et al.

(10) Patent No.: US 8,495,253 B2
(45) Date of Patent: *Jul. 23, 2013

(54) BI-DIRECTIONAL DATA TRANSFER WITHIN A SINGLE I/O OPERATION

(75) Inventors: John R. Flanagan, Poughkeepsie, NY (US); Daniel F. Casper, Poughkeepsie, NY (US); Catherine C. Huang, Poughkeepsie, NY (US); Matthew J. Kalos, Tucson, AZ (US); Ugochukwu C. Njoku, Yonkers, NY (US); Dale F. Riedy, Poughkeepsie, NY (US); Gustav E. Sittmann, Webster Groves, MO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/075,993

(22) Filed: Mar. 30, 2011

(65) Prior Publication Data

US 2011/0196993 A1 Aug. 11, 2011

Related U.S. Application Data

(63) Continuation of application No. 12/030,954, filed on Feb. 14, 2008, now Pat. No. 7,941,570.

(51) Int. Cl.
*G06F 3/00* (2006.01)
*G06F 13/00* (2006.01)
*G06F 15/00* (2006.01)
*G06F 15/76* (2006.01)

(52) U.S. Cl.
USPC .......... 710/5; 710/4; 710/20; 710/21; 710/33; 712/22

(58) Field of Classification Search
None
See application file for complete search history.

(56) References Cited

U.S. PATENT DOCUMENTS 3,693,161 A 9/1972 Price et al.
3,943,283 A 3/1976 Caragliano et al.
(Continued)

FOREIGN PATENT DOCUMENTS

DE 3931514 3/1990
GB 1264096 2/1972
(Continued)

OTHER PUBLICATIONS

U.S. Appl. No. 12/031,201 Final Office Action dated Jun. 13, 2011.
(Continued)

*Primary Examiner* — Idriss N Alrobaye
*Assistant Examiner* — Dayton Lewis-Taylor
(74) *Attorney, Agent, or Firm* — Cantor Colburn LLP; John Campbell

(57) ABSTRACT

An article of manufacture, apparatus, and a method for facilitating input/output (I/O) processing for an I/O operation at a host computer system configured for communication with a control unit. The method includes the host computer system obtaining a transport command word (TCW) for an I/O operation having both input and output data. The TCW specifies a location of the output data and a location for storing the input data. The host computer system forwards the I/O operation to the control unit for execution. The host computer system gathers the output data responsive to the location of the output data specified by the TCW, and then forwards the output data to the control unit for use in the execution of the I/O operation. The host computer system receives the input data from the control unit and stores the input data at the location specified by the TCW.

37 Claims, 13 Drawing Sheets

U.S. PATENT DOCUMENTS

| | | |
|---|---|---|
| 4,004,277 A | 1/1977 | Gavril |
| 4,080,649 A | 3/1978 | Calle et al. |
| 4,207,609 A | 6/1980 | Luiz et al. |
| 4,374,415 A | 2/1983 | Cormier et al. |
| 4,380,046 A | 4/1983 | Frosch et al. |
| 4,455,605 A | 6/1984 | Cormier et al. |
| 4,497,022 A | 1/1985 | Cormier et al. |
| 4,564,903 A | 1/1986 | Guyette et al. |
| 4,760,518 A | 7/1988 | Potash et al. |
| 4,779,188 A | 10/1988 | Gum et al. |
| 4,837,677 A | 6/1989 | Burrus, Jr. et al. |
| 4,843,541 A | 6/1989 | Bean et al. |
| 4,866,609 A | 9/1989 | Calta et al. |
| 4,870,566 A | 9/1989 | Cooper et al. |
| 5,016,160 A | 5/1991 | Lambeth et al. |
| 5,031,091 A | 7/1991 | Wakatsuki et al. |
| 5,040,108 A | 8/1991 | Kanazawa |
| 5,170,472 A | 12/1992 | Cwiakala et al. |
| 5,185,736 A | 2/1993 | Tyrrell et al. |
| 5,237,325 A | 8/1993 | Klein et al. |
| 5,265,240 A | 11/1993 | Galbraith et al. |
| 5,297,262 A | 3/1994 | Cox et al. |
| 5,301,323 A | 4/1994 | Maeurer et al. |
| 5,317,739 A | 5/1994 | Elko et al. |
| 5,367,661 A * | 11/1994 | Hough et al. ............... 710/5 |
| 5,386,512 A | 1/1995 | Crisman et al. |
| 5,388,219 A | 2/1995 | Chan et al. |
| 5,410,727 A | 4/1995 | Jaffe et al. |
| 5,414,851 A | 5/1995 | Brice, Jr. et al. |
| 5,434,980 A | 7/1995 | Casper et al. |
| 5,440,729 A | 8/1995 | Kimura et al. |
| 5,452,455 A | 9/1995 | Brown et al. |
| 5,461,721 A | 10/1995 | Cormier et al. |
| 5,463,736 A | 10/1995 | Elko et al. |
| 5,465,359 A | 11/1995 | Allen et al. |
| 5,500,942 A | 3/1996 | Eickemeyer et al. |
| 5,517,670 A | 5/1996 | Allen et al. |
| 5,526,484 A | 6/1996 | Casper et al. |
| 5,528,755 A | 6/1996 | Beardsley et al. |
| 5,539,918 A | 7/1996 | Allen et al. |
| 5,546,533 A | 8/1996 | Koyama |
| 5,548,791 A | 8/1996 | Casper et al. |
| 5,561,809 A | 10/1996 | Elko et al. |
| 5,564,040 A | 10/1996 | Kubala |
| 5,568,648 A | 10/1996 | Coscarella et al. |
| 5,584,039 A | 12/1996 | Johnson et al. |
| 5,600,793 A | 2/1997 | Nord |
| 5,600,805 A | 2/1997 | Fredericks et al. |
| 5,608,898 A | 3/1997 | Turpin et al. |
| 5,613,163 A | 3/1997 | Marron et al. |
| 5,640,600 A | 6/1997 | Satoh et al. |
| 5,640,603 A | 6/1997 | Meritt et al. |
| 5,644,712 A | 7/1997 | Coscarella et al. |
| 5,671,441 A | 9/1997 | Glassen et al. |
| 5,680,580 A | 10/1997 | Beardsley et al. |
| 5,758,190 A | 5/1998 | Johnson et al. |
| 5,768,620 A | 6/1998 | Johnson et al. |
| 5,793,983 A | 8/1998 | Albert et al. |
| 5,812,877 A | 9/1998 | Young |
| 5,831,985 A | 11/1998 | Sandorfi |
| 5,845,146 A | 12/1998 | Onodera |
| 5,860,022 A | 1/1999 | Kondou et al. |
| 5,894,583 A | 4/1999 | Johnson et al. |
| 5,901,327 A | 5/1999 | Ofek |
| 5,907,684 A | 5/1999 | Halma et al. |
| 5,918,028 A | 6/1999 | Silverthorn et al. |
| 5,996,026 A | 11/1999 | Onodera et al. |
| 6,125,399 A | 9/2000 | Hamilton |
| 6,125,411 A | 9/2000 | Sato |
| 6,195,330 B1 | 2/2001 | Sawey et al. |
| 6,202,095 B1 | 3/2001 | Beardsley et al. |
| 6,230,218 B1 | 5/2001 | Casper et al. |
| 6,249,787 B1 | 6/2001 | Schleimer et al. |
| 6,263,380 B1 | 7/2001 | Tsuboi et al. |
| 6,338,105 B1 | 1/2002 | Niizuma et al. |
| 6,343,335 B1 | 1/2002 | Dahman et al. |
| 6,347,334 B1 | 2/2002 | Fredericks et al. |
| 6,351,779 B1 | 2/2002 | Berg et al. |
| 6,353,612 B1 | 3/2002 | Zhu et al. |
| 6,460,087 B1 | 10/2002 | Saito et al. |
| 6,484,217 B1 | 11/2002 | Fuente et al. |
| 6,546,435 B1 | 4/2003 | Yoshimura et al. |
| 6,584,511 B1 | 6/2003 | Marsh, III et al. |
| 6,609,161 B1 | 8/2003 | Young |
| 6,609,165 B1 | 8/2003 | Frazier |
| 6,647,016 B1 | 11/2003 | Isoda et al. |
| 6,651,125 B2 | 11/2003 | Maergner et al. |
| 6,654,954 B1 | 11/2003 | Hicks |
| 6,658,603 B1 | 12/2003 | Ward |
| 6,687,766 B1 | 2/2004 | Casper et al. |
| 6,693,880 B2 | 2/2004 | Gregg et al. |
| 6,694,390 B1 | 2/2004 | Bogin et al. |
| 6,751,680 B2 | 6/2004 | Langerman et al. |
| 6,751,683 B1 | 6/2004 | Johnson et al. |
| 6,769,009 B1 | 7/2004 | Reisman |
| 6,772,207 B1 | 8/2004 | Dorn et al. |
| 6,826,661 B2 | 11/2004 | Umbehocker et al. |
| 6,839,773 B2 | 1/2005 | Vishlitzky et al. |
| 6,862,322 B1 | 3/2005 | Ewen et al. |
| 6,898,202 B2 | 5/2005 | Gallagher et al. |
| 6,915,378 B2 | 7/2005 | Roberti |
| 6,950,888 B1 | 9/2005 | Rooney et al. |
| 6,963,940 B1 | 11/2005 | Glassen et al. |
| 7,000,036 B2 | 2/2006 | Carlson et al. |
| 7,003,700 B2 | 2/2006 | Elko et al. |
| 7,020,810 B2 | 3/2006 | Holman |
| 7,035,540 B2 | 4/2006 | Finan et al. |
| 7,058,735 B2 | 6/2006 | Spencer |
| 7,085,860 B2 | 8/2006 | Dugan et al. |
| 7,100,096 B2 | 8/2006 | Webb, Jr. et al. |
| 7,111,130 B2 | 9/2006 | Blake et al. |
| 7,120,728 B2 | 10/2006 | Krakirian et al. |
| 7,124,207 B1 | 10/2006 | Lee et al. |
| 7,133,988 B2 | 11/2006 | Fujibayashi |
| 7,149,823 B2 | 12/2006 | Miller et al. |
| 7,155,569 B2 | 12/2006 | Johnson et al. |
| 7,164,425 B2 | 1/2007 | Kwak et al. |
| 7,174,274 B2 | 2/2007 | Carlson et al. |
| 7,202,801 B2 | 4/2007 | Chou |
| 7,277,387 B2 | 10/2007 | Sanders et al. |
| 7,292,597 B2 | 11/2007 | Mills et al. |
| 7,315,911 B2 | 1/2008 | Davies et al. |
| 7,373,435 B2 | 5/2008 | Carlson et al. |
| 7,382,733 B2 | 6/2008 | Banerjee et al. |
| 7,395,284 B2 | 7/2008 | Sato et al. |
| 7,398,335 B2 | 7/2008 | Sonksen et al. |
| 7,484,021 B2 | 1/2009 | Rastogi et al. |
| 7,500,023 B2 | 3/2009 | Casper et al. |
| 7,500,030 B2 | 3/2009 | Hathorn et al. |
| 7,502,873 B2 | 3/2009 | Casper et al. |
| 7,512,133 B2 | 3/2009 | Dugan et al. |
| 7,516,248 B2 | 4/2009 | Carlson et al. |
| 7,539,777 B1 | 5/2009 | Aitken |
| 7,543,087 B2 | 6/2009 | Philbrick et al. |
| 7,555,554 B2 | 6/2009 | Manders et al. |
| 7,558,827 B2 | 7/2009 | Kawashima et al. |
| 7,564,791 B2 | 7/2009 | Jayakrishnan et al. |
| 7,577,772 B2 | 8/2009 | Sonksen et al. |
| 7,577,773 B1 | 8/2009 | Gandhi et al. |
| 7,594,057 B1 | 9/2009 | Gandhi et al. |
| 7,599,360 B2 | 10/2009 | Edsall et al. |
| 7,600,053 B2 | 10/2009 | Carlson et al. |
| 7,711,871 B1 | 5/2010 | Haechten et al. |
| 7,743,197 B2 | 6/2010 | Chavan et al. |
| 7,765,336 B2 | 7/2010 | Butler et al. |
| 7,826,349 B2 | 11/2010 | Kaur et al. |
| 7,840,717 B2 | 11/2010 | Flanagan et al. |
| 7,840,718 B2 | 11/2010 | Ricci et al. |
| 7,840,719 B2 | 11/2010 | Casper et al. |
| 7,856,511 B2 | 12/2010 | Ricci et al. |
| 2001/0030943 A1 | 10/2001 | Gregg et al. |
| 2002/0032810 A1 | 3/2002 | Wagner |
| 2002/0062407 A1 | 5/2002 | Tateyama et al. |
| 2002/0099967 A1 | 7/2002 | Kawaguchi |
| 2002/0152338 A1 | 10/2002 | Elliott et al. |
| 2002/0178404 A1 | 11/2002 | Austen et al. |
| 2003/0056000 A1 | 3/2003 | Mullendore et al. |

| | | |
|---|---|---|
| 2003/0084213 A1 | 5/2003 | Brice, Jr. et al. |
| 2003/0103504 A1 | 6/2003 | Dugan et al. |
| 2003/0158998 A1 | 8/2003 | Smith |
| 2003/0187627 A1 | 10/2003 | Hild et al. |
| 2003/0188053 A1 | 10/2003 | Tsai |
| 2003/0208581 A1 | 11/2003 | Behren et al. |
| 2004/0030822 A1 | 2/2004 | Rajan et al. |
| 2004/0054776 A1 | 3/2004 | Klotz et al. |
| 2004/0113772 A1 | 6/2004 | Hong Chou |
| 2004/0125960 A1 | 7/2004 | Fosgate et al. |
| 2004/0136241 A1 | 7/2004 | Rapp et al. |
| 2004/0151160 A1 | 8/2004 | Sanders et al. |
| 2004/0193968 A1 | 9/2004 | Dugan et al. |
| 2004/0210719 A1 | 10/2004 | Bushey et al. |
| 2004/0230706 A1 | 11/2004 | Carlson et al. |
| 2004/0260851 A1 | 12/2004 | Tu |
| 2005/0018673 A1 | 1/2005 | Dropps et al. |
| 2005/0102456 A1 | 5/2005 | Kang |
| 2005/0105456 A1 | 5/2005 | Cookson et al. |
| 2005/0108251 A1 | 5/2005 | Hunt |
| 2005/0175341 A1 | 8/2005 | Ovadia |
| 2005/0193029 A1 | 9/2005 | Rom et al. |
| 2005/0204069 A1 | 9/2005 | Carlson et al. |
| 2005/0216617 A1 | 9/2005 | Carlson et al. |
| 2005/0223291 A1 | 10/2005 | Zimmer et al. |
| 2005/0229033 A1 | 10/2005 | Tanaka et al. |
| 2005/0257118 A1 | 11/2005 | Shien |
| 2006/0036769 A1 | 2/2006 | Frey et al. |
| 2006/0050726 A1 | 3/2006 | Ahmed et al. |
| 2006/0075154 A1 | 4/2006 | Carlson et al. |
| 2006/0085595 A1 | 4/2006 | Slater |
| 2006/0159112 A1 | 7/2006 | Sundaram et al. |
| 2006/0224795 A1 | 10/2006 | Muto et al. |
| 2007/0005838 A1 | 1/2007 | Chang et al. |
| 2007/0016554 A1 | 1/2007 | Dapp et al. |
| 2007/0061463 A1 | 3/2007 | Hiramatsu et al. |
| 2007/0072543 A1 | 3/2007 | Paila et al. |
| 2007/0079022 A1 | 4/2007 | Carlson et al. |
| 2007/0079051 A1 | 4/2007 | Tanaka et al. |
| 2007/0091497 A1 | 4/2007 | Mizuno et al. |
| 2007/0162631 A1 | 7/2007 | Balakrishnan et al. |
| 2007/0174544 A1 | 7/2007 | Yasuda et al. |
| 2007/0239944 A1 | 10/2007 | Rupanagunta et al. |
| 2007/0294697 A1 | 12/2007 | Theimer et al. |
| 2008/0040519 A1 | 2/2008 | Starr et al. |
| 2008/0043563 A1 | 2/2008 | Brice et al. |
| 2008/0059638 A1 | 3/2008 | Hathorn et al. |
| 2008/0103754 A1 | 5/2008 | Carlson et al. |
| 2008/0103755 A1 | 5/2008 | Carlson et al. |
| 2008/0109580 A1 | 5/2008 | Carlson et al. |
| 2008/0147889 A1 | 6/2008 | Casper et al. |
| 2008/0147890 A1 | 6/2008 | Casper et al. |
| 2008/0183877 A1 | 7/2008 | Carlson et al. |
| 2008/0235553 A1 | 9/2008 | Chintada et al. |
| 2008/0256264 A1 | 10/2008 | Muto et al. |
| 2008/0273518 A1 | 11/2008 | Pratt |
| 2008/0307122 A1 | 12/2008 | Butler et al. |
| 2009/0049241 A1 | 2/2009 | Ohno et al. |
| 2009/0055585 A1 | 2/2009 | Fernandes et al. |
| 2009/0144586 A1 | 6/2009 | Casper et al. |
| 2009/0172203 A1 | 7/2009 | Casper et al. |
| 2009/0210557 A1 | 8/2009 | Gainey, Jr. et al. |
| 2009/0210559 A1 | 8/2009 | Flanagan et al. |
| 2009/0210560 A1 | 8/2009 | Yudenfriend et al. |
| 2009/0210561 A1 | 8/2009 | Ricci et al. |
| 2009/0210562 A1 | 8/2009 | Huang et al. |
| 2009/0210563 A1 | 8/2009 | Flanagan et al. |
| 2009/0210564 A1 | 8/2009 | Ricci et al. |
| 2009/0210570 A1 | 8/2009 | Bendyk et al. |
| 2009/0210571 A1 | 8/2009 | Casper et al. |
| 2009/0210572 A1 | 8/2009 | Yudenfriend et al. |
| 2009/0210573 A1 | 8/2009 | Yudenfriend et al. |
| 2009/0210576 A1 | 8/2009 | Casper et al. |
| 2009/0210579 A1 | 8/2009 | Bendyk et al. |
| 2009/0210580 A1 | 8/2009 | Bendyk et al. |
| 2009/0210581 A1 | 8/2009 | Flanagan et al. |
| 2009/0210582 A1 | 8/2009 | Bendyk et al. |
| 2009/0210583 A1 | 8/2009 | Bendyk et al. |
| 2009/0210584 A1 | 8/2009 | Carlson et al. |
| 2009/0210585 A1 | 8/2009 | Ricci et al. |
| 2009/0210768 A1 | 8/2009 | Carlson et al. |
| 2009/0210769 A1 | 8/2009 | Casper et al. |
| 2009/0210884 A1 | 8/2009 | Ricci et al. |
| 2009/0307388 A1 | 12/2009 | Tchapda |
| 2010/0014526 A1 | 1/2010 | Chavan et al. |
| 2010/0064072 A1 | 3/2010 | Tang et al. |

FOREIGN PATENT DOCUMENTS

| | | |
|---|---|---|
| GB | 2291990 A | 9/1995 |
| GB | 2291990 | 2/1996 |
| JP | 63236152 | 10/1988 |
| JP | 2010-140127 A | 6/2010 |
| WO | 2006102664 A2 | 9/2006 |

OTHER PUBLICATIONS

U.S. Appl. No. 12/946,514, Non-Final Office Action Mailed Jun. 23, 2011.

U.S. Appl. No. 12/183,323, Notice of Allowance Mailed Jun. 23, 2011.

Aboda, B.-et al.; Network Working Group; "Securing Block Storage Protocols Over IP"; ACM Digital Library; RFC3723; Apr. 2004.

Azimi, R.-et al.; "miNI: Reducing Network Interface Memory Requirements with Dynamic Handle Lookup"; ACM Digital Library; pp. 261-272; Jun. 2003.

Emulex Corporation; "Install the LP850 Host Adapter"; GOOGLE/Emulex Corporation, LightPulse LP850 Fibre Channel PCI Host Adapter Manuals; pp. 1-10, 1999.

Foong, A.-et al.; "Towards SSD-Ready Enterprise Platforms"; GOOGLE/INTEL Corporation; 2008-2009.

Hewlett-Packard Company; HP A4800A PCI FWD SCSI Host Bus Adapter—Service & User Guide, Edition 6; GOOGLE/H-P; 2001.

Hewlett-Packard Company; "HP A5149 PCI Ultra2 SCSI Host Bus Adapter—Service and User Guide", Edition 2; GOOGLE/H-P; 2001.

U.S. Appl. No. 12/030,951, Notice of Allowance Mailed Apr. 4, 2011.

U.S. Appl. No. 12/364,615, Notice of Allowance Mailed Mar. 10, 2011.

Jiang, J.-et al.; "The Role of FCoE in I/O Consolidation"; ACM Digital Library/International Conf on Advanced Infocomm Technology '08; Jul. 2008.

Josephson, WK.-et al.; "DFS: A File System for Virtualized Flash Storage"; ACM Digital Library; vol. 6, No. 3, Article 14, Sep. 2010.

LSI Corporation; "PCI Express to 6Gb/s SAS Host Bus Adapters"; GOOGLE; Chapter 1, Introduction/Overview; LSI User Guide; Oct. 2009.

LSI; "ScsiPortGetDeivceBase"; GOOGLE/LSI; Apr. 2003.

Magoutis, K.; "The Optimistic Direct Access File System: Design and Network Interface Support"; Division of Engineering & Applied Science, Harvard Univ.; Feb. 2002.

Miller, DJ.-et al.; "Motivating Future Interconnects: A Differential Measurement Analysis of PCI Latency"; ACM Digital Library; pp. 94-105; Oct. 2009.

Network Storage Systems; GOOGLE; Oct. 2007.

Sun, Oracle; "Sun Storage 6 Gb SAS PCIe HBA, External—Installation Guide for HBA Models"; GOOGLE; Revision A; Nov. 2010.

Petersen, MK.-et al.; "DIF/DIX Aware Linux SCSI HBA Interface"; GOOGLE; Oracle Linux Engineering; Jul. 2008.

Satran, J.-et al.; Network Working Group; "Internet Small Computer Systems Interface (iSCSI)"; ACM Digital Library; RFC3720; Apr. 2004.

Vaghani, SB.; "Virtual Machine File System"; VMWare Inc./ACM Digital Library; pp. 57-69; 2008-2009.

U.S. Appl. No. 12/183,315, filed Jul. 31, 2008.

U.S. Appl. No. 12/030,967 Restriction Requirement Mailed Dec. 29, 2009.

U.S. Appl. No. 12/183,305, filed Jul. 31, 2008.

ANSI INCITS 433-2007, Information Technology Fibre Channel Link Services (FC-LS), Jul. 2007.

Behrs, Jr, "Adaptive Prediction Minimizes Data Overrun and Underrun", IBM, Nov. 1994, pp. 1-3. http://priorartdatabase.com/IPCOM/000114189.

Cakmakci, Melih, et al. "Bi-Directional Communication amoung "Smart" Compoents in a Networked Control System", University of Michigan: Department of Mechanical Engineering, 2005 American control conference, Jun. 8-10, 2005, Portland, OR, pp. 627-632.

Meritt, A.S. and J.H. Sorg, "Correction of Channel Measurement Data Caused by Control Unit Queuing," IBM Technical Disclosure Bulletin, vol. 33, No. 11, Apr. 1991, pp. 100-103.

Dauby, et al. "Contention Resolution Between Two Processors"; IBM Technical Disclosure Bulletin; vol. 26; No. 10A; Mar. 1984; 3 pages.

DeVeer, J.A.; "Control Frame Multiplexing on Serial I/O Channels"; IBM Technical Disclosure Bulletin; vol. 32; No. 10A; Mar. 1990; pp. 39-40.

Fibre Channel Single Byte Command Code Sets-2 Mapping Protocol (FC-SB-3), T11/Project 1357-D/Rev 1.6, INCITS Mar. 2003.

"Information Technology-Fibre Channel Protocol for SCSI, Third Version (FCP-3)," T10 Project 1560-D, Revision 4g, Sep. 13, 2005.

U.S. Appl. No. 12/031,038 Non-Final Office Action dated Nov. 16, 2009.

U.S. Appl. No. 12/030,912 Non-Final Office Action dated Mar. 18, 2010.

U.S. Appl. No. 12/030,920 Non-Final Office Action dated Feb. 23, 2010.

U.S. Appl. No. 12/030,975 Non-Final Office Action dated Oct. 22, 2009.

U.S. Appl. No. 12/030,932 Non-Final Office Action dated Dec. 16, 2009.

U.S. Appl. No. 12/031,023 Non-Final Office Action dated Oct. 29, 2009.

U.S. Appl. No. 12/030,951 Non-Final Office Action dated May 20, 2010.

U.S. Appl. No. 12/030,951 Non-Final Office Action dated Nov. 23, 2009.

U.S. Appl. No. 12/030,961 Non-Final Office Action dated Dec. 17, 2009.

U.S. Appl. No. 12/030,939 Non-Final Office Action dated Nov. 16, 2009.

U.S. Appl. No. 12/030,989 Non-Final Office Action dated Oct. 22, 2009.

U.S. Appl. No. 12/030,993 Non-Final Office Action dated Oct. 28, 2009.

U.S. Appl. No. 12/031,021 Non-Final Office Action dated Jan. 8, 2010.

U.S. Appl. No. 12/181,662—Non-Final Office Action dated Jun. 18, 2009.

U.S. Appl. No. 12/181,662—Final Office Action dated Jan. 4, 2010.

U.S. Appl. No. 12/031,038, Notice of Allowance Mailed Oct. 6, 2010.

U.S. Appl. No. 12/031,038, Non-Final Office Action Mailed Apr. 15, 2010.

U.S. Appl. No. 12/030,912; Final Office Action; mailed Oct. 6, 2010.

U.S. Appl. No. 12/031,182 Final Office Action Mailed Jul. 22, 2010.

U.S. Appl. No. 12/031,182, Non Final Office Action Mailed Dec. 23, 2010.

U.S. Appl. No. 12/030,920, Notice of Allowance Mailed Dec. 28, 2010.

U.S. Appl. No. 12/030,920 Notice of Allowance Mailed Aug. 23, 2010.

U.S. Appl. No. 12/030,954 Non-Final Office Action dated Jan. 21, 2010.

U.S. Appl. No. 12/030,954, Notice of Allowance mailed Dec. 28, 2010.

U.S. Appl. No. 12/030,975; Final Office Action Mailed May 13, 2010.

U.S. Appl. No. 12/030,975, Notice of Allowance Mailed Oct. 19, 2010.

U.S. Appl. No. 12/030,932, Final Office Action Mailed Jul. 23, 2010.

U.S. Appl. No. 12/030,932, Non-Final Office Action Mailed Dec. 16, 2010.

U.S. Appl. No. 12/031,023, Final Office Action Mailed Nov. 18, 2010.

U.S. Appl. No. 12/030,951, Final Office Action Mailed Oct. 26, 2010.

U.S. Appl. No. 12/030,961 Notice of Allowance Mailed Nov. 5, 2010.

U.S. Appl. No. 12/030,967 Notice of Allowance Mailed Oct. 7, 2010.

U.S. Appl. No. 12/030,967, Notice of Allowance mailed Apr. 23, 2010.

U.S. Appl. No. 12/031,201, Final Office Action Mailed Aug. 3, 2010.

U.S. Appl. No. 12/031,201, Non-Final Office Action Mailed Dec. 27, 2010.

U.S. Appl. No. 12/030,985, Non Final Office Action Mailed May 5, 2010.

U.S. Appl. No. 12/030,985, Notice of Allowance mailed Nov. 24, 2010.

U.S. Appl. No. 12/030,993, Final Office Action Mailed Dec. 10, 2010.

U.S. Appl. No. 12/031,201 Non-Final Office Action dated Jan. 25, 2010.

U.S. Appl. No. 12/030,989 Final Office Action dated May 24, 2010.

U.S. Appl. No. 12/183,315, Notice of Allowance Mailed on Jun. 15, 2010.

International Search Report; International Application No. PCT/EP2009/059184; International Filing Date: Jul. 16, 2009; Date of mailing: Jan. 14, 2010; 9 pages.

"Protocol for Insochronous Traffic Over Fiber Channel Switching"; IBM Technical Disclosure Bulletin; vol. 37, No. 06B; Jun. 1994. pp. 377-380.

Golasky, Richard; "Link-Level Error Recovery With Tape Backup"; Dell Power Solutions; Aug. 2005; pp. 88-91.

Sachs, M.W.; "I/O Marker Changing"; IBM Technical Disclosure Bulletin; vol. 37, No. 02A; Feb. 1994; pp. 75-76.

SCSI Primary Commands-4 (SPC-4); Project T10/1731-D. Rev 11. INCITS Apr. 14, 2010.

Simmons et al.; "A Performance Comparison of Three Supercomputers: Fujitsu VP-2600, NEC SX-3, and CRAY Y-MP"; ACM, Conference on High Performance Networking and Computing, Proceedings of the 1991 ACM/IEEE conference on Supercomputing, Albuquerque, New Mexico; Jul. 1991; pp. 150-157.

Snively, et al.; "Fibre Channel, Framing and Signaling"; (FC-FS) Rev. 1.70; NCITS Working Draft Proposed American National Standard for Information Technology; Feb. 2002; pp. i-575.

Snively et al.; Fibre Channel Single Byte Command Code Sets-3 Mapping Protocol (FC-SB-3); T11/Project 1357-D/Rev. 1.6, INCITS; Mar. 2003; pp. 1-206.

Srikrishnan et al.; "Sharing FCP Adapters Through Virtualization"; IBM J. Res. & Dev., vol. 51, No. 1/2; Jan./ Mar. 2007; pp. 103-118.

Stone, et al.; "When the CRC and TCP Checksum Disagree"; SIGCOMM '00, Stockholm, Sweden; Jul. 2000; 10 pages.

Laudon et al. •System Overview of the SGI Origin 200/2000 Product Line, 1997, iEEE Publication pp. 150-156.

Tachikawa, T., et al. "ARQ protocols for bi-directional data transmission," Information Networking, 1998 (ICOIN-12) Proceedings., Twelfth International Conference on., vol., No., pp. 468-473, Jan. 21-23, 1998.

U.S. Appl. No. 12/183,323, filed Jul. 31, 2008.

U.S. Appl. No. 12/030,939 Notice of Alllowance mailed Jun. 29, 2010.

U.S. Appl. No. 12/030,954 Non Final Office Action mailed Jul. 12, 2010.

U.S. Appl. No. 12/030,961 Final Office Action mailed Jul. 12, 2010.

U.S. Appl. No. 12/031,021 Notice of Allowance mailed Jul. 8, 2010.

U.S. Appl. No. 12/031,023 Non Final Office Action mailed Jun. 11, 2010.

U.S. Appl. No. 12/183,323 Non Final Office Action mailed Jul. 19, 2010.

U.S. Appl. No. 12/392,246 Notice of Allowance mailed Jul. 15, 2010.

Z/Architecture, "Principles of Operation SA 22-7832-01 International Business Machines Corporation," 2nd Edition, Oct. 2001.

"z/Architecture—Principles of Operation," IBM Publication No. SA22-7832-04, 5th Ed., Sep. 2005.

U.S. Appl. No. 12/031,042, Final Office Action Mailed Oct. 25, 2010.

U.S. Appl. No. 12/031,042, Non-Final Office Action Mailed Apr. 5, 2010.

U.S. Appl. No. 12/031,021, Notice of Allowance Mailed Apr. 30, 2010.

U.S. Appl. No. 12/181,662, Notice of Allowance Mailed Aug. 4, 2010.

U.S. Appl. No. 12/364,615, Non Final Office Action Mailed Oct. 7, 2010.

U.S. Appl. No. 12/183,305, Non-Final Office Action Mailed May 11, 2010.
U.S. Appl. No. 12/183,305, Notice of Allowance Mailed Nov. 1, 2010.
U.S. Appl. No. 12/183,315, Notice of Allowance Mailed Dec. 13, 2010.
U.S. Appl. No. 12/183,315 Notice of Allowance dated Sep. 15, 2010.
U.S. Appl. No. 12/183,323, Non-Final Office Action Mailed Jan. 3, 2011.
IBM, "Method and Apparatus to Monitor PAV Utilization", Feb. 2005, pp. 1-3. http://priorartdatabase.com/IPCOM/000082878.
IBM® z/Architecture Principles of Operation, Publication No. SA22-7832-05, 6th Edition, Apr. 2007. 1,215 pages separated into 4 electronic attachments_Part 1.
IBM® z/Architecture Principles of Operation, Publication No. SA22-7832-05, 6th Edition, Apr. 2007. 1,215 pages separated into 4 electronic attachments. Part 2.
IBM® z/Architecture Principles of Operation, Publication No. SA22-7832-05, 6th Edition, Apr. 2007. 1,215 pages separated into 4 electronic attachments. Part 3.
IBM® z/Architecture Principles of Operation, Publication No. SA22-7832-05, 6th Edition, Apr. 2007. 1,215 pages separated into 4 electronic attachments. Part 4.
Z/Series Input/Output Configuration Program users Guide for IYP IOCP, SB10-7029-03c. International Business Machines Corporation, Jun. 2003.
Iren, et al.; "The Transport Layer: Tutorial and Survey"; ACM Computing Surveys; vol. 31, No. 4; Dec. 1999; pp. 360-405.
Ishikawa, Hikaru, et al. "Bi-Directional OFDM Transmission using Adaptive Modulation that spreads Data Symbols". Power Line Communications and its Applications, 2006, IEEE International Symposium on, vol., No., pp. 202-207.
International Search Report and Written Opinion for PCT/EP2009/051447 dated Jul. 1, 2009.
International Search Report and Written Opinion for PCT/EP2009/051483 dated Jul. 27, 2009.
Written Opinion and International Search Report for PCT/EP2009/051445 dated Jun. 25, 2009.
Written Opinion and International Search Report for PCT/EP2009/051446 dated Jun. 25, 2009.
Written Opinion and International Search Report for PCT/EP2009/051461 dated Sep. 22, 2009.
Written Opinion and International Search Report for PCT/EP2009/051462 dated Jul. 1, 2009.
Written Opinion and International Search Report for PCT/EP2009/051450 dated Jul. 7, 2009.
Written Opinion and International Search Report for PCT/EP2009/051459 dated Jun. 23, 2009.
Written Opinion and International Search Report for PCT/EP2009/051463 dated Jul. 22, 2009.
Moore et al., Reconfiguration of Storage Elements to Improve Performance, IBM, Dec. 1983, pp. 1-3. http://priorartdatabas.com/IPCOM/000047719.
Nordstrom.; "Sequence Reception Method for a Fibre Channel Protocol Chip"; IBM Technical Disclosure Bulletin; vol. 38, No. 12; Dec. 1995; pp. 267-269.
Peterson; "Information Techonology, Fibre Channel Protocol for SCSI, Fourth Version (FCP-3)", Draft Proposed American National Standard, Jun. 2004; pp. 1-142.
Patent No. 7,000,036 Notice of Allowance dated Feb. 3, 2006.
Patent No. 7,000,036 Non-Final Office Action dated Jul. 15, 2005.
Patent No. 7,174,274 Non-Final Office Action dated Jun. 8, 2006.
Patent No. 7,174,274 Non-Final Office Action dated Jun. 21, 2006.
Patent No. 7,174,274 Notice of Allowance Sep. 13, 2007.
Patent No. 7,174,274 Notice of Allowance Dec. 27, 2006.
U.S. Appl. No. 11/126,728 Non-Final Office Action Apr. 16, 2007.
Patent No. 7,373,435 Non-Final Office Action Jun. 11, 2007.
Patent No. 7,373, 435 Non-Final Office Action Sep. 13, 2007.
Patent No. 7,373,435 Notice of Allowance dated Apr. 30, 2008.
U.S. Appl. No. 11/469,573 Non-Final Office Action dated Apr. 11, 2008.
Patent No. 7,600,053 Non-Final Office Action dated Mar. 17, 2009.
Patent No. 7,600,053 Notice of Allowance dated Aug. 26, 2009.
U.S. Appl. No. 11/965,866 Non-Final Office Action dated Jun. 3, 2010.
Patent No. 7,516,248 Notice of Allowance Feb. 20, 2009.
U.S. Appl. No. 11/548,060 Non-Final Office Action dated Apr. 15, 2008.
U.S. Appl. No. 11/548,093 Non-Final Office Action dated Apr. 17, 2008.
U.S. Appl. No. 12/031,182 Non-Final Office Action dated Jan. 22, 2010.
U.S. Appl. No. 12/030,912 Non Final Office Action Mailed Aug. 18, 2011.
U.S. Appl. No. 12/031,182 Final Office Action dated Oct. 20, 2011.
U.S. Appl. No. 12/030,925, Notice of Allowance Mailed Sep. 7, 2011.
U.S. Appl. No. 12/030,932, Notice of Allowance mailed Nov. 1, 2011.
U.S. Appl. No. 12/030,981 Non Final Office Action Mailed Aug. 2, 2011.
U.S. Appl. No. 12/030,938, Notice of Allowance Mailed Aug. 8, 2011.
U.S. Appl. No. 12/030,989, Notice of Allowance Mailed Aug. 5, 2011.
U.S. Appl. No. 12/031,042, Non-Final Office Action Mailed Sep. 30, 2011.
URL, http://en.wikipedia.org/wiki/FICON, FICON, Wikipedia, USA, Wikimedia Foundation, Inc., Aug. 9, 2011.
U.S. Appl. No. 13/024,468, Non Final Office Action Mailed Jan. 26, 2012.
U.S. Appl. No. 12/030,912, Final Office Action Mailed Feb. 27, 2012.
U.S. Appl. No. 12/031,182 Non-Final Office Action dated Mar., 16, 2012.
U.S. Appl. No. 12/030,981, Notice of Allowance mailed Jan. 27, 2012.
U.S. Appl. No. 12/031,023, Non-Final Office Action Mailed Feb. 1, 2012.
U.S. Appl. No. 13/351,073, Non Final Office Action Mailed Mar. 30, 2012.
U.S. Appl. No. 12/030,993 Notice of Allowance Mailed Dec. 22, 2011.
U.S. Appl. No. 12/031,042, Notice of Allowance Mailed Feb. 29, 2012.

* cited by examiner

| WORD | BYTE 0 | BYTE 1 | BYTE 2 | BYTE 3 | BYTE 4 | BYTE 5 | BYTE 6 | BYTE 7 |
|---|---|---|---|---|---|---|---|---|
| 0 | F 000000 904 | FLAGS 906 | | | Reserved 908 | TCCBL (L1) 910 | R W | Reserved 914 |
| 1 | Output-Data Address 916 | | | | | | | |
| 2 | Input-Data Address 918 | | | | | | | |
| 3 | Transport-Status-Block Address 920 | | | | | | | |
| 4 | Transport-Command-Control Block Address 922 | | | | | | | |
| 5 | Output Count 924 | | | | Input Count 926 | | | |
| 6 | reserved 928 | | | | reserved 930 | | | |
| 7 | reserved 932 | | | | Interrogate-TCW Address 934 | | | |

BI-DIRECTIONAL DATA TRANSFER WITHIN A SINGLE I/O OPERATION

CROSS-REFERENCE TO RELATED APPLICATION

This application is a continuation of U.S. patent application Ser. No. 12/030,954, filed Feb. 14, 2008, the disclosure of which is incorporated by reference herein in its entirety.

BACKGROUND OF THE INVENTION

Field of the Invention

The present disclosure relates generally to input/output (I/O) processing, and in particular, to providing an I/O operation that includes both input and output data.

DESCRIPTION OF BACKGROUND

Input/output (I/O) operations are used to transfer data between memory and I/O devices of an I/O processing system. Specifically, data is written from memory to one or more I/O devices, and data is read from one or more I/O devices to memory by executing I/O operations.

To facilitate processing of I/O operations, an I/O subsystem of the I/O processing system is employed. The I/O subsystem is coupled to main memory and the I/O devices of the I/O processing system and directs the flow of information between memory and the I/O devices. One example of an I/O subsystem is a channel subsystem. The channel subsystem uses channel paths as communications media. Each channel path includes a channel coupled to a control unit, the control unit being further coupled to one or more I/O devices.

The channel subsystem may employ channel command words (CCWs) to transfer data between the I/O devices and memory. A CCW specifies the command to be executed. For commands initiating certain I/O operations, the CCW designates the memory area associated with the operation, the action to be taken whenever a transfer to or from the area is completed, and other options.

During I/O processing, a list of CCWs is fetched from memory by a channel. The channel parses each command from the list of CCWs and forwards a number of the commands, each command in its own entity, to a control unit coupled to the channel. The control unit then processes the commands. The channel tracks the state of each command and controls when the next set of commands are to be sent to the control unit for processing. The channel ensures that each command is sent to the control unit in its own entity. Further, the channel infers certain information associated with processing the response from the control unit for each command.

Performing I/O processing on a per CCW basis may involve a large amount of processing overhead for the channel subsystem, as the channels parse CCWs, track state information, and react to responses from the control units. Therefore, it may be beneficial to shift much of the processing burden associated with interpreting and managing CCW and state information from the channel subsystem to the control units. Simplifying the role of channels in communicating between the control units and an operating system in the I/O processing system may increase communication throughput as less handshaking is performed. Simplifying the role of channels in communication may include grouping multiple commands into a single I/O operation. However, altering command sequences by grouping two or more commands together in a single I/O operation may result in the I/O operation having both input data and output data. Currently, an I/O operation can support a single data area that may be utilized for data input or data output, but not both within the same I/O operation. This limits the kinds of commands that can be grouped together in a single I/O operation and thus, limits the increase in throughput that can be gained by grouping commands. Accordingly, there is a need in the art to be able to transfer both input data and output data within a single I/O operation.

BRIEF SUMMARY OF THE INVENTION

An exemplary embodiment includes a computer program product for facilitating input/output (I/O) processing for an I/O operation at a host computer system configured for communication with a control unit. The computer program product includes a tangible storage medium readable by a processing circuit and storing instructions for execution by the processing circuit for performing a method. The method includes the host computer system obtaining a transport command word (TCW) for an I/O operation having both input and output data. The TCW specifies a location of the output data and a location for storing the input data. The host computer system forwards the I/O operation to the control unit for execution. The host computer system gathers the output data responsive to the location of the output data specified by the TCW, and then forwards the output data to the control unit for use in the execution of the I/O operation. The host computer system receives the input data from the control unit and stores the input data at the location specified by the TCW.

Another exemplary embodiment includes a host computer system for providing bi-directional data transfer within a single I/O operation. The host system includes a host computer I/O subsystem that includes a channel adapter that is in communication with a control unit. The host I/O subsystem performs a method that includes the host computer system obtaining a TCW for an I/O operation having both input and output data. The TCW specifies a location of the output data and a location for storing the input data. The output data is gathered in response to the location of the output data specified by the TCW. The I/O operation and the output data is forwarded to the control unit for execution. The host computer system receives the input data from the control unit and stores it at the location specified by the TCW.

A further exemplary embodiment includes a method for facilitating I/O processing for an I/O operation at a host computer system configured for communication with a control unit. The method includes the host computer system obtaining a TCW for an I/O operation having both input and output data. The TCW specifies a location of the output data and a location for storing the input data. The host computer system forwards the I/O operation to the control unit for execution. The host computer system gathers the output data responsive to the location of the output data specified by the TCW, and then forwards the output data to the control unit for use in the execution of the I/O operation. The host computer system receives the input data from the control unit and stores the input data at the location specified by the TCW.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 9 depicts one embodiment of a TCW in accordance with an aspect of the present invention;

Figure 1:
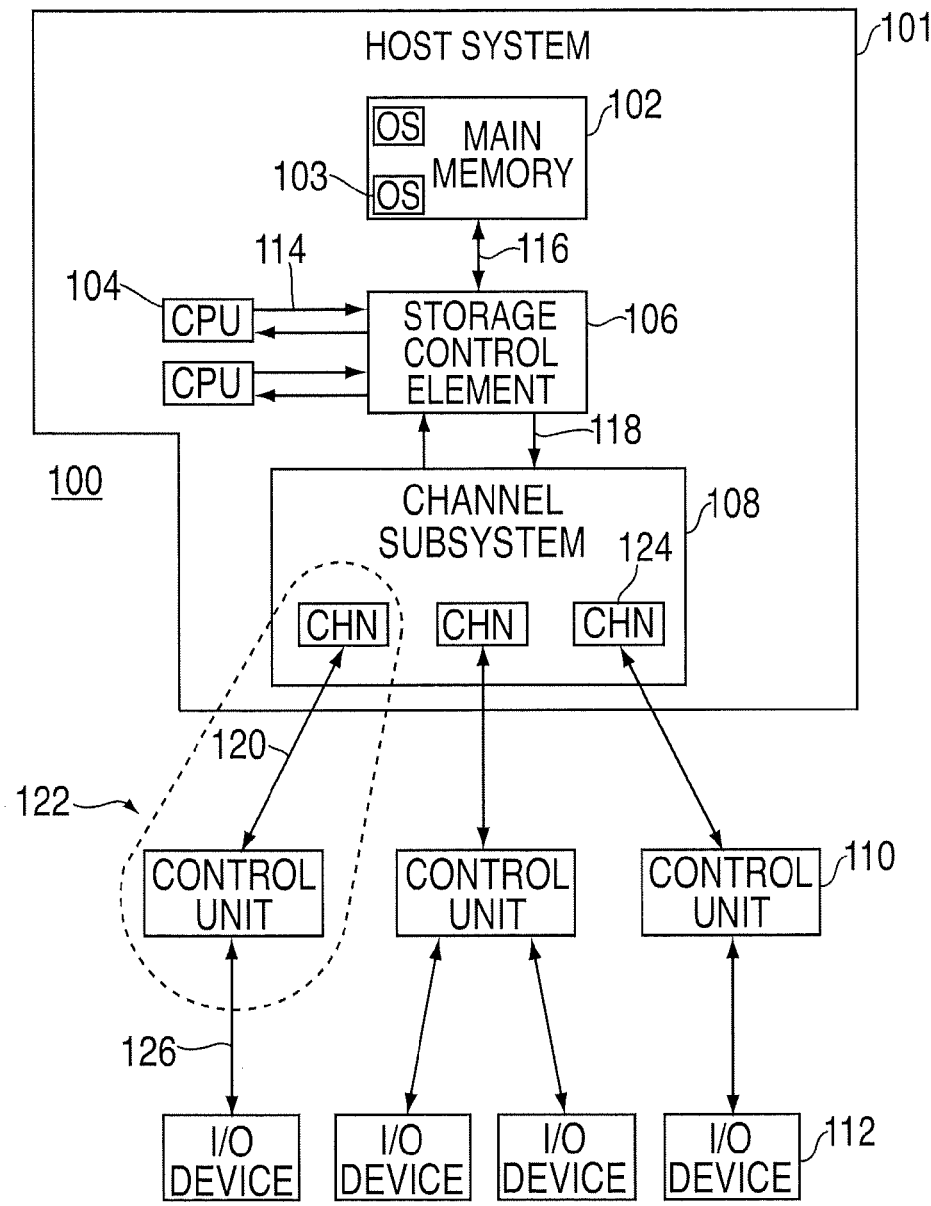
FIG. 1 depicts one embodiment of an I/O processing system incorporating and using one or more aspects of the present invention.

The detailed description explains the preferred embodiments of the invention, together with advantages and features, by way of example with reference to the drawings.

DETAILED DESCRIPTION OF THE INVENTION

In accordance with an aspect of the present invention, input/output (I/O) processing is facilitated by allowing a single I/O operation to include both input data and output data. Thus, each I/O operation can be utilized to transfer both an input stream and an output stream. This facilitates I/O processing by reducing communications between components of an I/O processing system used to perform the I/O processing. For instance, the number of exchanges and sequences between an I/O communications adapter, such as a channel, and a control unit is reduced. This is accomplished by sending a plurality of commands from the I/O communications adapter to the control unit as a single entity for execution by the control unit, and by the control unit sending the data resulting from the commands, if any, as a single entity. The plurality of device command words (DCWs) sent as a single entity to a control unit may include both read and write commands.

The plurality of commands are included in a block, referred to herein as a transport command control block (TCCB), an address of which is specified in a transport control word (TCW). The TCW is sent from an operating system (OS) or other application to the I/O communications adapter, which in turn forwards the TCCB in a command message to the control unit for processing. The control unit processes each of the commands absent a tracking of status relative to those individual commands by the I/O communications adapter. The plurality of commands is also referred to as a channel program, which is parsed and executed on the control unit rather than the I/O communications adapter.

In an exemplary embodiment, the TCW provides the pointers to the channel for all of the control blocks required to execute the I/O operation. In an exemplary embodiment, the TCW includes pointers to both an input data address and an output data address. This allows data to be transferred in both directions (e.g., from a channel to a control unit and from a control unit to a channel) within a single I/O operation.

One example of an I/O processing system incorporating and using one or more aspects of the present invention is described with reference to FIG. 1. I/O processing system 100 includes a host system 101, which further includes for instance, a main memory 102, one or more central processing units (CPUs) 104, a storage control element 106, and a channel subsystem 108. The host system 101 may be a large scale computing system, such as a mainframe or server. The I/O processing system 100 also includes one or more control units 110 and one or more I/O devices 112, each of which is described below.

Main memory 102 stores data and programs, which can be input from I/O devices 112. For example, the main memory 102 may include one or more operating systems (OSs) 103 that are executed by one or more of the CPUs 104. For example, one CPU 104 can execute a Linux® operating system 103 and a z/OS® operating system 103 as different virtual machine instances. The main memory 102 is directly addressable and provides for high-speed processing of data by the CPUs 104 and the channel subsystem 108.

CPU 104 is the controlling center of the I/O processing system 100. It contains sequencing and processing facilities for instruction execution, interruption action, timing functions, initial program loading, and other machine-related functions. CPU 104 is coupled to the storage control element 106 via a connection 114, such as a bidirectional or unidirectional bus.

Storage control element 106 is coupled to the main memory 102 via a connection 116, such as a bus; to CPUs 104 via connection 114; and to channel subsystem 108 via a connection 118. Storage control element 106 controls, for example, queuing and execution of requests made by one or more of the CPU 104 and the channel subsystem 108.

In an exemplary embodiment, channel subsystem 108 provides a communication interface between host system 101 and control units 110. Channel subsystem 108 is coupled to storage control element 106, as described above, and to each of the control units 110 via a connection 120, such as a serial link. Connection 120 may be implemented in any manner known in the art, including an optical link, employing single-mode or multi-mode waveguides in a Fibre Channel fabric (e.g., a fibre channel network). Channel subsystem 108 directs the flow of information between I/O devices 112 and main memory 102. It relieves the CPUs 104 of the task of communicating directly with the I/O devices 112 and permits data processing to proceed concurrently with I/O processing. The channel subsystem 108 uses one or more channel paths 122 as the communication links in managing the flow of information to or from I/O devices 112. As a part of the I/O processing, channel subsystem 108 also performs the path-management functions of testing for channel path availability, selecting an available channel path 122 and initiating execution of the operation with the I/O devices 112.

Each channel path 122 includes a channel 124 (channels 124 are located within the channel subsystem 108, in one example, as shown in FIG. 1), one or more control units 110 and one or more connections 120. In another example, it is also possible to have one or more dynamic switches (not depicted) as part of the channel path 122. A dynamic switch may be coupled to a channel 124 and a control unit 110 and provides the capability of physically interconnecting any two links that are attached to the switch. In another example, it is also possible to have multiple systems, and therefore multiple channel subsystems (not depicted) attached to one or more of the control units 110.

Also located within channel subsystem 108 are subchannels (not shown). One subchannel is provided for and dedicated to each I/O device 112 accessible to a program through the channel subsystem 108. A subchannel (e.g., a data structure, such as a table) provides the logical appearance of a device to the program. Each subchannel provides information concerning the associated I/O device 112 and its attachment to channel subsystem 108. The subchannel also provides information concerning I/O operations and other functions involving the associated I/O device 112. The subchannel is the means by which channel subsystem 108 provides information about associated I/O devices 112 to CPUs 104, which obtain this information by executing I/O instructions.

Channel subsystem 108 is coupled to one or more control units 110. Each control unit 110 provides logic to operate and control one or more I/O devices 112 and adapts, through the use of common facilities, the characteristics of each I/O device 112 to the link interface provided by the channel 124. The common facilities provide for the execution of I/O operations, indications concerning the status of the I/O device 112 and control unit 110, control of the timing of data transfers over the channel path 122 and certain levels of I/O device 112 control.

Each control unit 110 is attached via a connection 126 (e.g., a bus) to one or more I/O devices 112. I/O devices 112 receive information or store information in main memory 102 and/or other memory. Examples of I/O devices 112 include card readers and punches, magnetic tape units, direct access storage devices, displays, keyboards, printers, pointing devices, teleprocessing devices, communication controllers and sensor based equipment, to name a few.

One or more of the above components of the I/O processing system 100 are further described in "IBM® z/Architecture Principles of Operation," Publication No. SA22-7832-05, 6th Edition, April 2007; U.S. Pat. No. 5,461,721 entitled "System For Transferring Data Between I/O Devices And Main Or Expanded Storage Under Dynamic Control Of Independent Indirect Address Words (IDAWS)," Cormier et al., issued Oct. 24, 1995; and U.S. Pat. No. 5,526,484 entitled "Method And System For Pipelining The Processing Of Channel Command Words," Casper et al., issued Jun. 11, 1996, each of which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

Figure 2A:
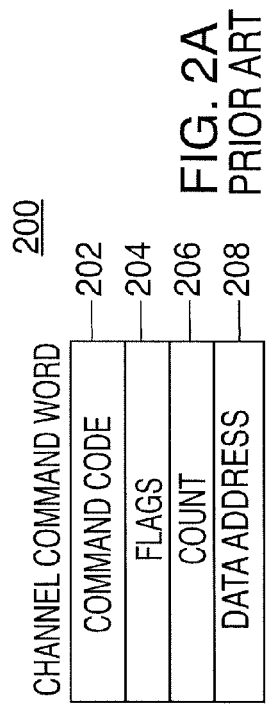
FIG. 2A depicts one example of a prior art channel command word.

In one embodiment, to transfer data between I/O devices 112 and memory 102, channel command words (CCWs) are used. A CCW specifies the command to be executed, and includes other fields to control processing. One example of a CCW is described with reference to FIG. 2A. A CCW 200 includes, for example, a command code 202 specifying the command to be executed (e.g., read, read backward, control, sense and write); a plurality of flags 204 used to control the I/O operation; for commands that specify the transfer of data, a count field 206 that specifies the number of bytes in the storage area designated by the CCW to be transferred; and a data address 208 that points to a location in main memory that includes the data, when direct addressing is employed, or to a list (e.g., contiguous list) of modified indirect data address words (MIDAWs) to be processed, when modified indirect data addressing is employed. Modified indirect addressing is further described in U.S. application Ser. No. 11/464,613, entitled "Flexibly Controlling The Transfer Of Data Between Input/Output Devices And Memory," Brice et al., filed Aug. 15, 2006, which is hereby incorporated herein by reference in its entirety.

One or more CCWs arranged for sequential execution form a channel program, also referred to herein as a CCW channel program. The CCW channel program is set up by, for example, an operating system, or other software. The software sets up the CCWs and obtains the addresses of memory assigned to the channel program. An example of a CCW channel program is described with reference to FIG. 2B. A CCW channel program 210 includes, for instance, a define extent CCW 212 that has a pointer 214 to a location in memory of define extent data 216 to be used with the define extent command. In this example, a transfer in channel (TIC) 218 follows the define extent command that refers the channel program to another area in memory (e.g., an application area) that includes one or more other CCWs, such as a locate record 217 that has a pointer 219 to locate record data 220, and one or more read CCWs 221. Each read CCW 220 has a pointer 222 to a data area 224. The data area includes an address to directly access the data or a list of data address words (e.g., MIDAWs or IDAWs) to indirectly access the data. Further, CCW channel program 210 includes a predetermined area in the channel subsystem defined by the device address called the subchannel for status 226 resulting from execution of the CCW channel program.

The processing of a CCW channel program is described with reference to FIG. 3, as well as with reference to FIG. 2B. In particular, FIG. 3 shows an example of the various exchanges and sequences that occur between a channel and a control unit when a CCW channel program is executing. The link protocol used for the communications is FICON (Fibre Connectivity), in this example. Information regarding FICON is described in "Fibre Channel Single Byte Command Code Sets-3 Mapping Protocol" (FC-SB-3), T11/Project 1357-D/Rev. 1.6, INCITS (March 2003), which is hereby incorporated herein by reference in its entirety.

Referring to FIG. 3, a channel 300 opens an exchange with a control unit 302 and sends a define extent command and data associated therewith 304 to control unit 302. The command is fetched from define extent CCW 212 (FIG. 2B) and the data is obtained from define extent data area 216. The channel 300 uses TIC 218 to locate the locate record CCW and the read CCW. It fetches the locate record command 305 (FIG. 3) from the locate record CCW 217 (FIG. 2B) and obtains the data from locate record data 220. The read command 306 (FIG. 3) is fetched from read CCW 221 (FIG. 2B). Each is sent to the control unit 302.

The control unit 302 opens an exchange 308 with the channel 300, in response to the open exchange of the channel 300. This can occur before or after locate command 305 and/or read command 306. Along with the open exchange, a response (CMR) is forwarded to the channel 300. The CMR provides an indication to the channel 300 that the control unit 302 is active and operating.

The control unit 302 sends the requested data 310 to the channel 300. Additionally, the control unit 302 provides the status to the channel 300 and closes the exchange 312. In response thereto, the channel 300 stores the data, examines the status and closes the exchange 314, which indicates to the control unit 302 that the status has been received.

The processing of the above CCW channel program to read 4 k of data requires two exchanges to be opened and closed and seven sequences. The total number of exchanges and sequences between the channel and control unit is reduced through collapsing multiple commands of the channel program into a TCCB. The channel, e.g., channel 124 of FIG. 1, uses a TCW to identify the location of the TCCB, as well as locations for accessing and storing status and data associated with executing the channel program. The TCW is interpreted by the channel 124 and is not sent or seen by the control unit 110.

One example of a channel program to read 4 k of data, as in FIG. 2B, but includes a TCCB, instead of separate individual CCWs, is described with reference to FIG. 4. As shown, a channel program 400, referred to herein as a TCW channel program, includes a TCW 402 specifying a location in memory of a TCCB 404, as well as a location in memory of a data area 406 or a TIDAL 410 (i.e., a list of transport mode indirect data address words (TIDAWs), similar to MIDAWs) that points to data area 406, and a status area 408.

The processing of a TCW channel program is described with reference to FIG. 5. The link protocol used for these communications is, for instance, Fibre Channel Protocol (FCP). In particular, three phases of the FCP link protocol are used, allowing host bus adapters to be used that support FCP to perform data transfers controlled by CCWs. FCP and its phases are described further in "Information Technology-Fibre Channel Protocol for SCSI, Third Version (FCP-3)," T10 Project 1560-D, Revision 4, Sep. 13, 2005, which is hereby incorporated herein by reference in its entirety.

The FCP defines the following terms, as recited in "Information Technology-Fibre Channel Protocol for SCSI, Third Version (FCP-3)", pages 3-5:

N_Port: A hardware entity that supports the FC-FS-2 FC-2 layer. It may act as an Originator, a Responder, or both;
Originator: The logical function associated with an N_Port responsible for originating an Exchange;
Responder: The logical function in an N_Port responsible for supporting the Exchange initiated by the Originator in another N_Port;
Exchange: The basic mechanism that transfers information consisting of one or more related nonconcurrent Sequences that may flow in the same or opposite directions. The Exchange is identified by an Originator Exchange_ID (OX_ID) and a Responder Exchange_Identifier (RX_ID);
Sequence: A set of one or more Data frames with a common Sequence_ID (SEQ_ID), transmitted unidirectionally from one N_Port to another N_Port with a corresponding response, if applicable, transmitted in response to each Data frame; and
FCP_Port: An N_Port or NL_Port that supports the SCSI Fibre Channel Protocol.

Fibre Channel (FC) is logically a point-to-point serial data channel. The Fibre Channel Physical layer (FC-2 layer) described by FC-FS-2 performs those functions required to transfer data from one N_Port or NL_Port to another. An FC-4 mapping layer uses the services provided by FC-FS-2 to perform the functions defined by the FC-4. The protocol is described in terms of the stream of FC IUs and Exchanges generated by a pair of FCP_Ports that support the FC-4. The I/O operation defined by SAM-3 is mapped into a Fibre Channel Exchange. A Fibre Channel Exchange carrying information for a SCSI I/O operation is an FCP Exchange. The request and response primitives of an I/O operation are mapped into Information Units (IUs) as shown in table 1.

TABLE 1

SCSI and Fibre Channel Protocol functions

| SCSI function | FCP equivalent |
| --- | --- |
| I/O operation | Exchange |
| Protocol Service request and response | Sequence |
| Send SCSI Command request | Unsolicited command IU (FCP_CMND) |
| Data delivery request | Data descriptor IU (FCP_XFER_RDY) |
| Data delivery action | Solicited data IU (FCP_DATA) |
| Send Command Complete response | Command status IU (FCP_RSP) |
| REQ/ACK for Command Complete | Confirmation IU (FCP_CONF) |

An application client begins an FCP I/O operation when it invokes a Send SCSI Command SCSI transport protocol service request or a Send Task Management Request SCSI transport protocol service request (see SAM-3). The Send SCSI Command SCSI transport protocol service request conveys a single request or a list of linked requests from the application client to the FCP service delivery subsystem. Each request contains all the information necessary for the processing of one SCSI command or task management function, including the local storage address and characteristics of data. The Fibre Channel Protocol then performs the following actions using FC-FS-2 services to perform the SCSI command or task management function. (FCP-3, p. 10)

The FCP_Port that is the initiator for the command starts an Exchange by sending an unsolicited command IU containing the FCP_CMND IU payload, including some command controls, addressing information, and the SCSI command descriptor block (CDB). The initiator FCP_Port sends the FCP_CMND IU payload to invoke the Send SCSI Command SCSI transport protocol service request (see SAM-3) and start the FCP I/O operation. The Exchange that is started is identified by its fully qualified exchange identifier (FQXID) during the remainder of the FCP I/O operation and is used only for the IUs associated with that FCP I/O operation. (FCP-3, p. 10)

After all the data has been transferred, the device server transmits the Send Command Complete protocol service response (described in SAM-3) by requesting the transmission of an IU containing the FCP_RSP IU payload. That payload contains the SCSI status and, if the SCSI status is CHECK CONDITION, the autosense data describing the condition. The FCP_RSP IU indicates completion of the SCSI command. If no command linking, error recovery, or confirmed completion is requested, the FCP_RSP IU is the final sequence of the Exchange. The device server determines whether additional linked commands are to be performed in the FCP I/O operation. If this is the last or only command processed in the FCP I/O operation, the FCP I/O operation and the Exchange are terminated. (FCP-3, p. 11)

Figure 5:
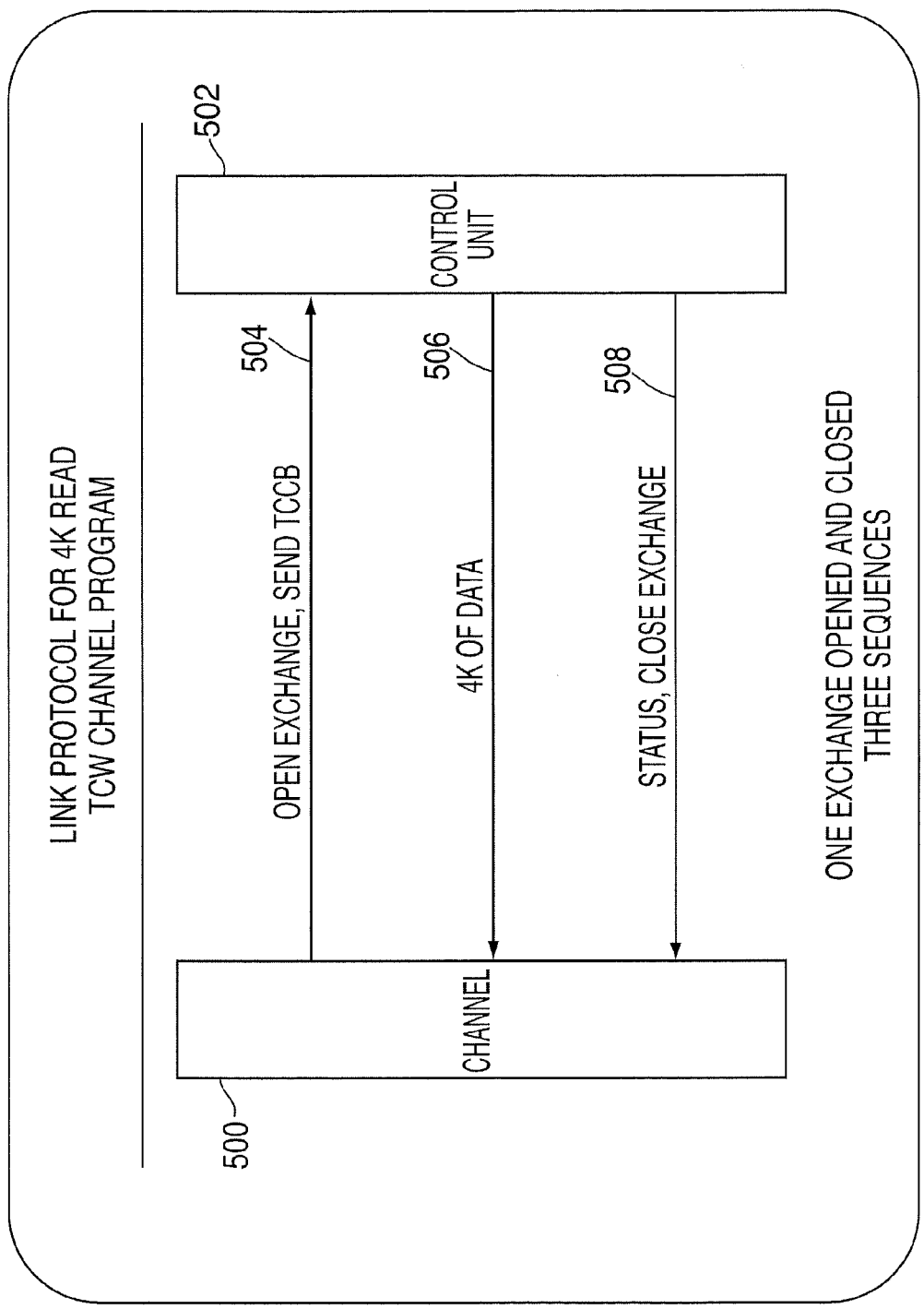
FIG. 5 depicts one embodiment of a link protocol used to communicate between a channel and control unit to execute the TCW channel program of FIG. 4, in accordance with an aspect of the present invention.

Referring to FIG. 5, a channel 500 opens an exchange with a control unit 502 and sends TCCB 504 to the control unit 502. In one example, the TCCB 504 and sequence initiative are transferred to the control unit 502 in a FCP command, referred to as FCP_CMND information unit (IU) or a transport command IU. The control unit 502 executes the multiple commands of the TCCB 504 (e.g., define extent command, locate record command, read command as device control words (DCWs)) and forwards data 506 to the channel 500 via, for instance, a FCP_Data IU. It also provides status and closes the exchange 508. As one example, final status is sent in a FCP status frame that has a bit active in, for instance, byte 10 or 11 of the payload of a FCP_RSP IU, also referred to as a transport response IU. The FCP_RSP_IU payload may be used to transport FICON ending status along with additional status information.

In a further example, to write 4 k of customer data, the channel 500 uses the FCP link protocol phases, as follows:
1. Transfer a TCCB in the FCP_CMND IU.
2. Transfer the IU of data, and sequence initiative to the control unit 502. (FCP Transfer Ready Disabled)
3. Final status is sent in a FCP status frame that has a bit active in, for instance, byte 10 or 11 of the FCP_RSP IU Payload. The FCP_RES_INFO field or sense field is used to transport FICON ending status along with additional status information.

Figure 2B:
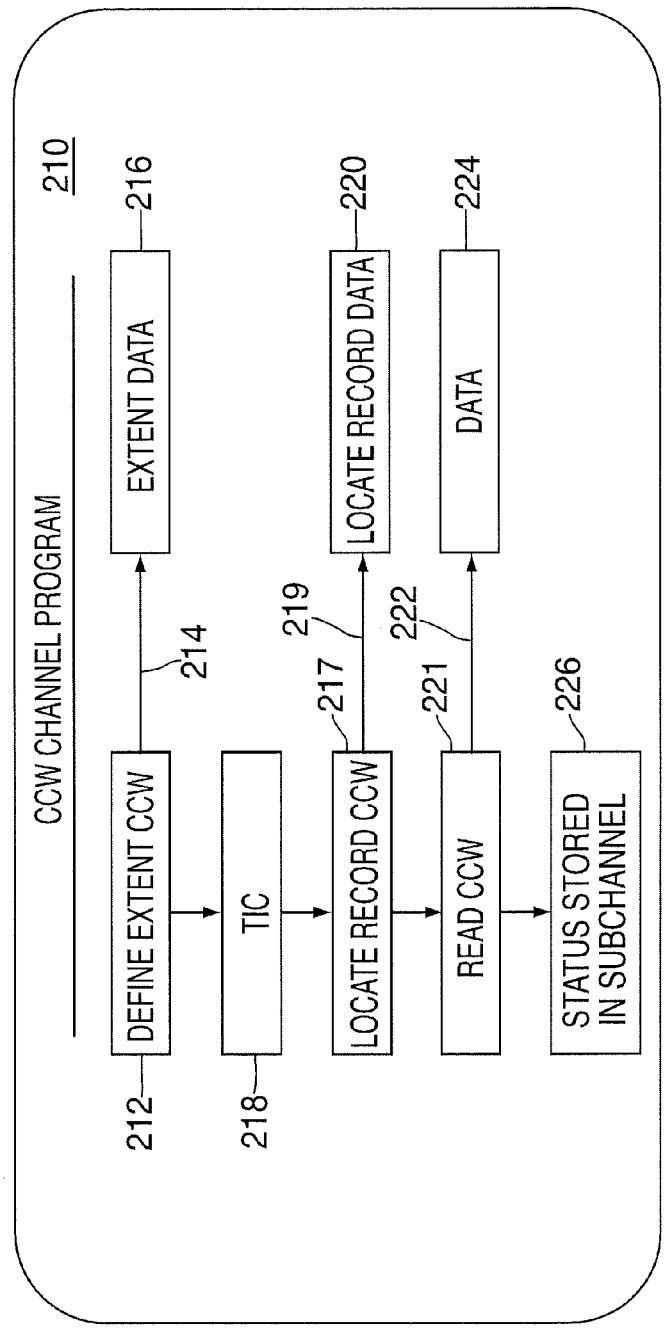
FIG. 2B depicts one example of a prior art channel command word channel program.
Figure 3:
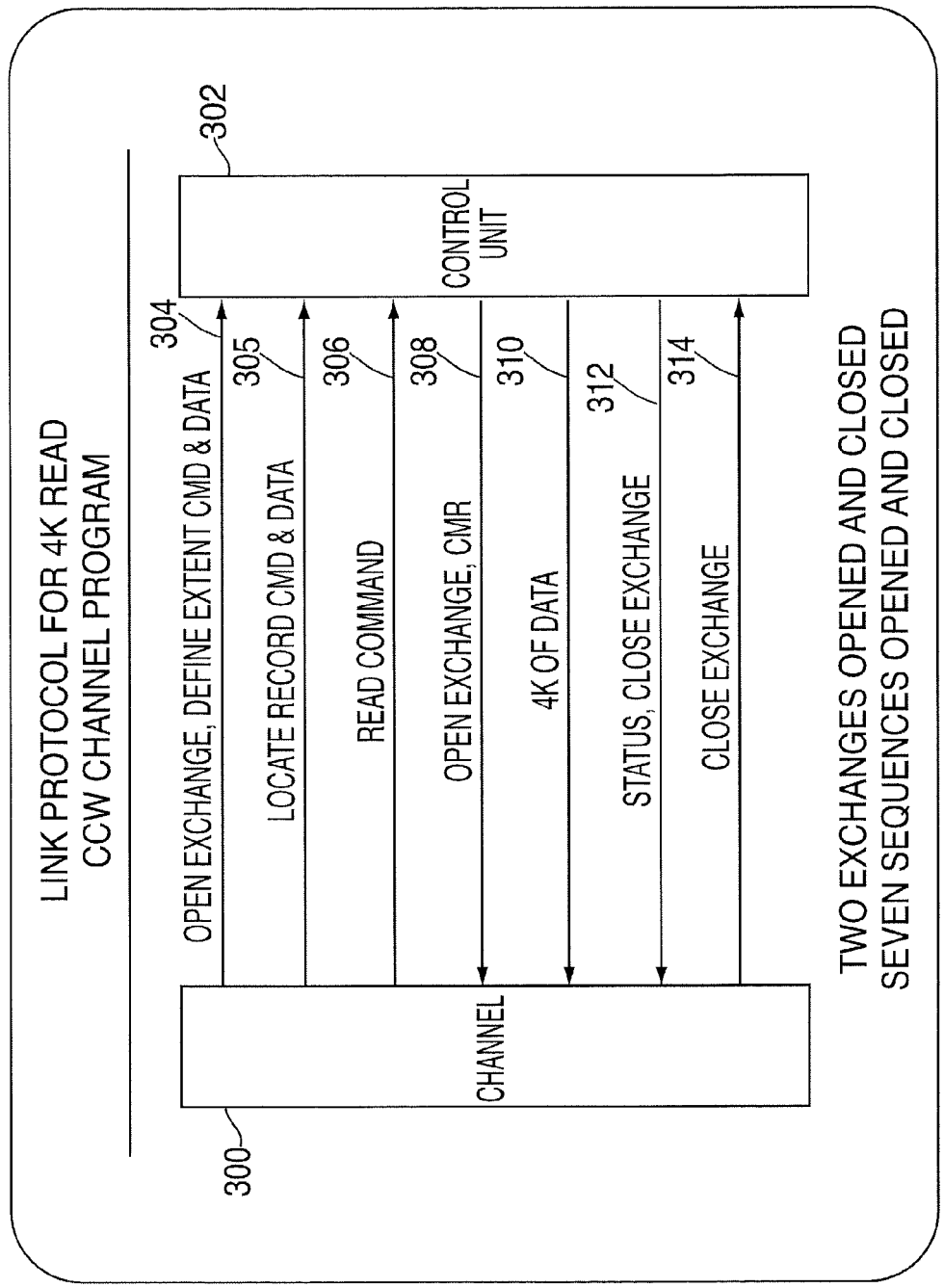
FIG. 3 depicts one embodiment of a prior art link protocol used in communicating between a channel and control unit to execute the channel command word channel program of FIG. 2B.
Figure 4:
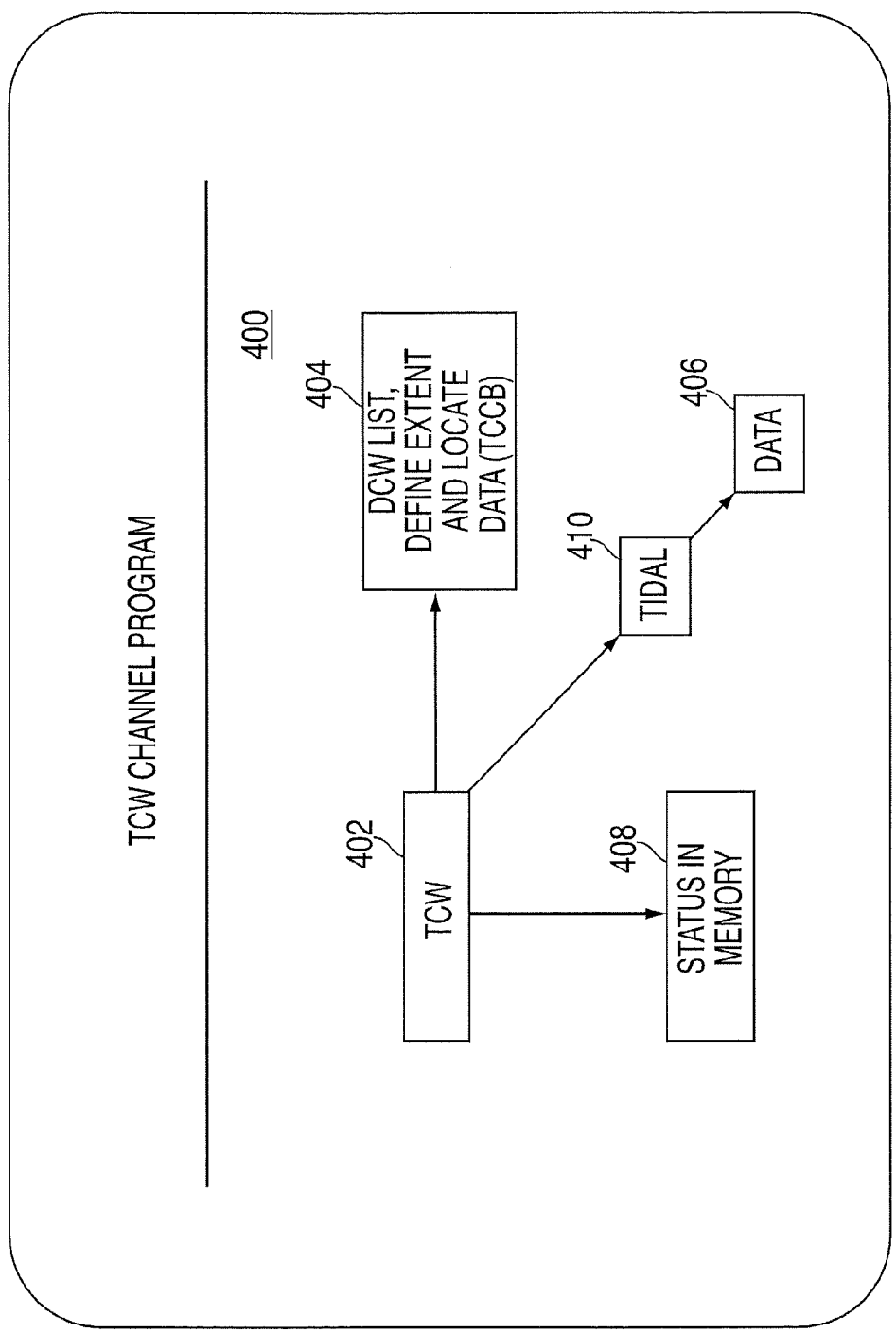
FIG. 4 depicts one embodiment of a transport control word (TCW) channel program, in accordance with an aspect of the present invention.

By executing the TCW channel program of FIG. 4, there is only one exchange opened and closed (see also FIG. 5), instead of two exchanges for the CCW channel program of FIG. 2B (see also FIG. 3). Further, for the TCW channel program, there are three communication sequences (see FIGS. 4-5), as compared to seven sequences for the CCW channel program (see FIGS. 2B-3).

Figure 6:
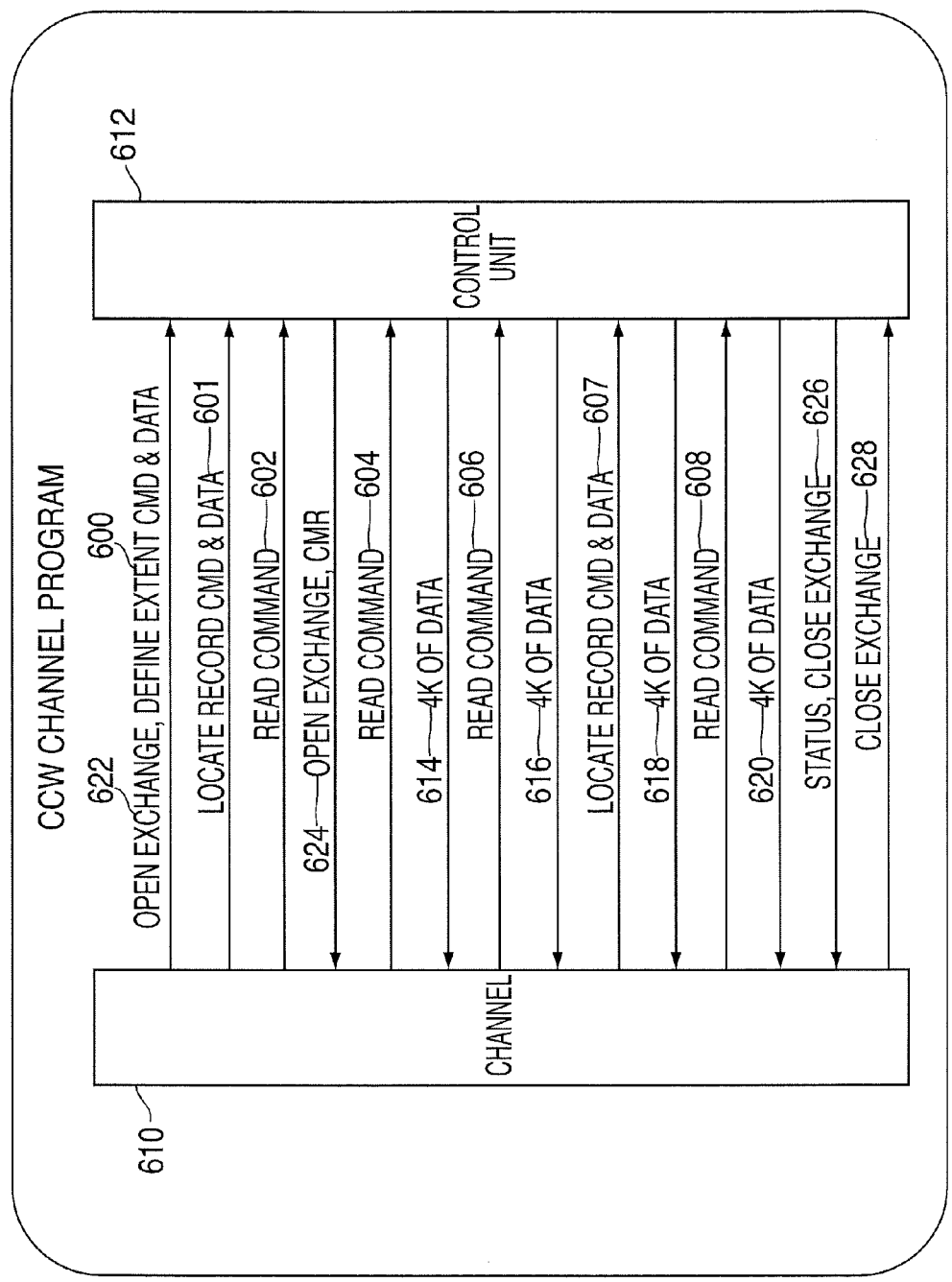
FIG. 6 depicts one embodiment of a prior art link protocol used to communicate between a channel and control unit in order to execute four read commands of a channel command word channel program.

The number of exchanges and sequences remain the same for a TCW channel program, even if additional commands are added to the program. Compare, for example, the communications of the CCW channel program of FIG. 6 with the communications of the TCW channel program of FIG. 7. In the CCW channel program of FIG. 6, each of the commands (e.g., define extent command 600, locate record command 601, read command 602, read command 604, read command 606, locate record command 607 and read command 608) are sent in separate sequences from channel 610 to control unit 612. Further, each 4 k block of data (e.g., data 614-620) is sent in separate sequences from the control unit 612 to the channel 610. This CCW channel program requires two exchanges to be opened and closed (e.g., open exchanges 622, 624 and close exchanges 626, 628), and fourteen communications sequences. This is compared to the three sequences and one exchange for the TCW channel program of FIG. 7, which accomplishes the same task as the CCW channel program of FIG. 6.

Figure 7:
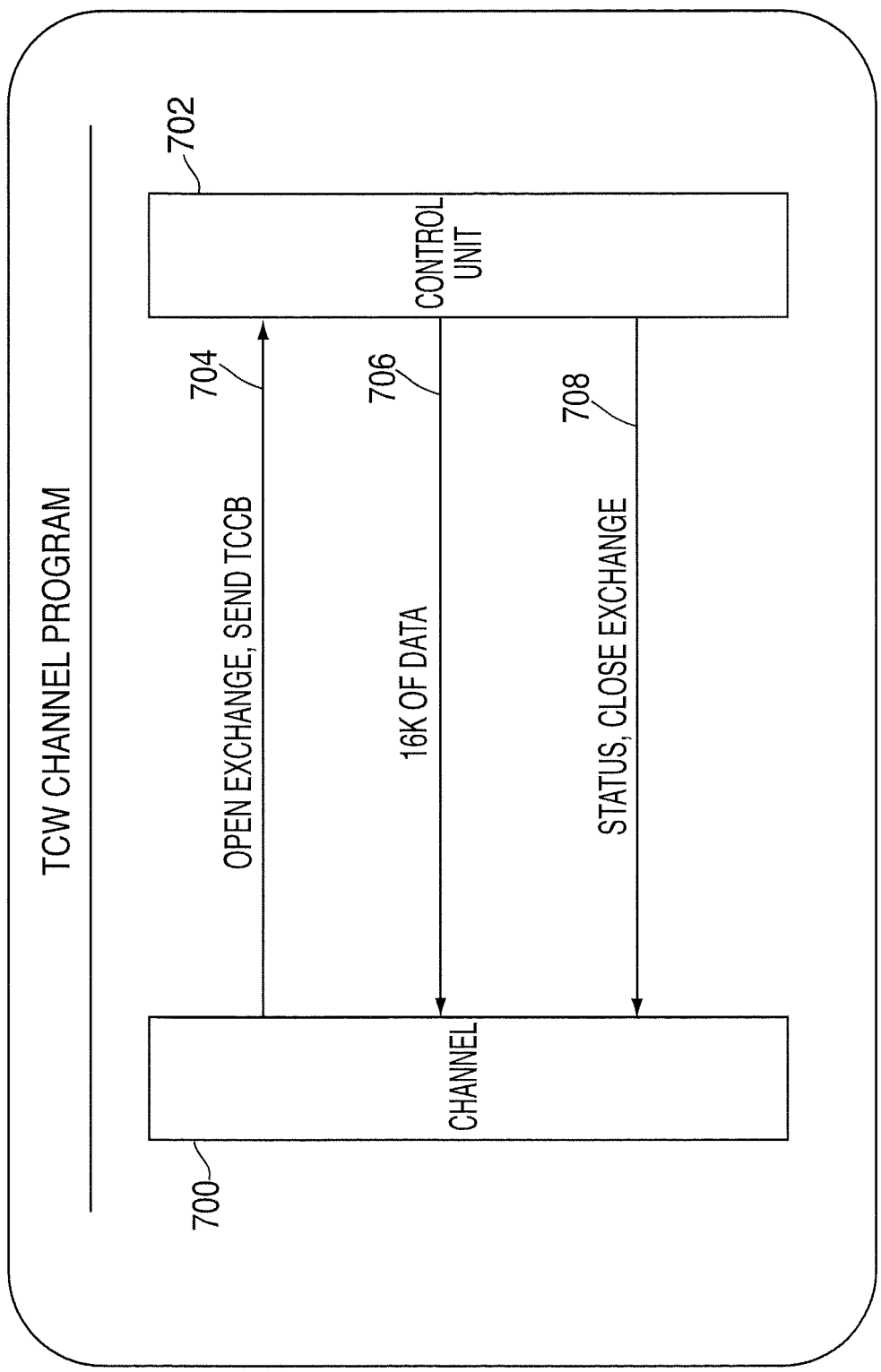
FIG. 7 depicts one embodiment of a link protocol used to communicate between a channel and control unit to process the four read commands of a TCW channel program, in accordance with an aspect of the present invention.

As depicted in FIG. 7, a channel 700 opens an exchange with a control unit 702 and sends a TCCB 704 to the control unit 702. The TCCB 704 includes the define extent command, the two locate record commands, and the four read commands in DCWs, as described above. In response to receiving the TCCB 704, the control unit 702 executes the commands and sends, in a single sequence, the 16 k of data 706 to the channel 700. Additionally, the control unit 702 provides status to the channel 700 and closes the exchange 708. Thus, the TCW channel program requires much fewer communications to transfer the same amount of data as the CCW channel program of FIG. 6.

Figure 8:
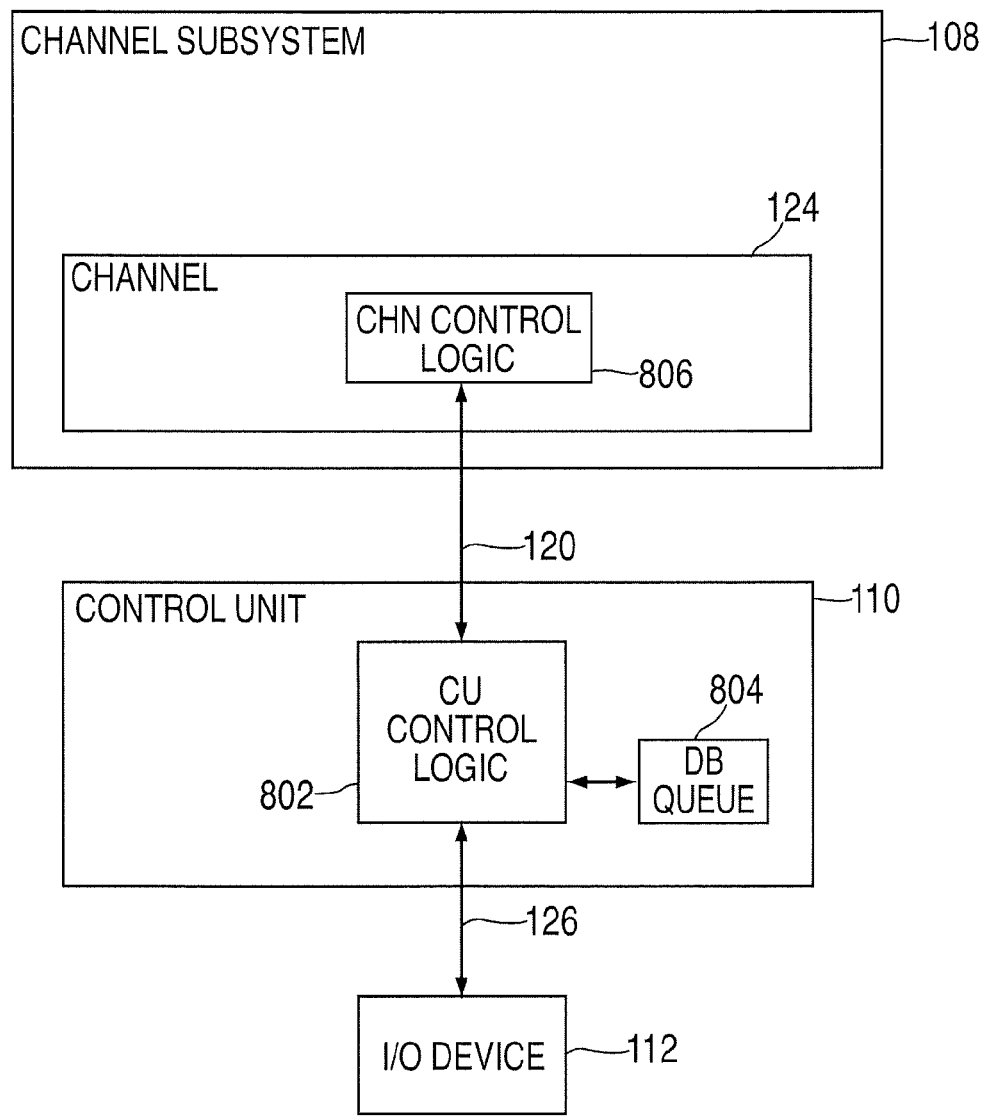
FIG. 8 depicts one embodiment of a control unit and a channel subsystem, in accordance with an aspect of the present invention.

Turning now to FIG. 8, one embodiment of the channel 124 in the channel subsystem 108 and the control unit 110 and the channel 124 of FIG. 1 that support TCW channel program execution are depicted in greater detail. The control unit 110 includes CU control logic 802 to parse and process command messages containing a TCCB, such as the TCCB 704 of FIG. 7, received from the channel 124 via the connection 120. The CU control logic 802 can extract DCWs and control data from the TCCB received at the control unit 110 to control a device, for instance, I/O device 112 via connection 126. The CU control logic 802 sends device commands and data to the I/O device 112, and receives status information and other feedback from the I/O device 112. For example, the I/O device 112 may be busy because of a previous reservation request targeting I/O device 112. To manage potential device reservation contention issues that can arise when the control unit 110 receives multiple requests to access the same I/O device 112, the CU control logic 802 keeps track of and stores device busy messages and associated data in a device busy queue 804. In an exemplary embodiment, an OS 103 of FIG. 1 reserves I/O device 112 to keep other OSs 103 from accessing the I/O device 112 while the reservation is active. Although device reservation is not required for all I/O operations, device reservation can be used to support operations that necessitate exclusive access for a fixed duration of time, e.g., disk formatting.

The control unit 110 may further include other buffer or memory elements (not depicted) to store multiple messages or status information associated with communications between the channel 124 and the I/O device 112. For example, a register located on the control unit 110 may include a maximum control unit exchange parameter that defines the maximum number of open control unit exchanges that the control unit 110 supports.

The channel 124 in the channel subsystem 108 includes multiple elements to support communication with the control unit 110. In an exemplary embodiment, the CHN control logic 806 controls communication between the channel subsystem 108 and the control unit 110. The CHN control logic 806 may directly interface to the CU control logic 802 via the connection 120 to send commands and receive responses, such as transport command and response IUs. Alternatively, messaging interfaces and/or buffers (not depicted) can be placed between the CHN control logic 806 and the CU control logic 802.

An exemplary embodiment of a transport control word (TCW) 900 is depicted in FIG. 9. The TCW 900 is utilized by the channel 124 to set up the I/O operation and is not sent to the control unit 110. The TCW depicted in FIG. 9 provides for both input and output data within a single I/O operation.

In an exemplary TCW 900 depicted in FIG. 9, a format field 902 equal to "00b" indicates that what follows is a TCW 900. The TCW 900 also includes reserved bits 904 for possible future use.

The TCW 900 also includes a flags field 906. The first five bits of the flags field 906 are reserved for future use and are set to zero. The sixth bit of the flags field 906 is a TIDAL read flag. In an exemplary embodiment, the TIDAL read flag is set to one when the input-data address field 918 contains an address of a TIDAL. If the TIDAL read flag is set to zero, then the input-data address field 918 contains a data address. The seventh bit of the flags field 906 is a TCCB TIDAL flag. In an exemplary embodiment, the TCCB TIDAL flag is set to one when the TCCB address field 922 contains an address of a TIDAL. If the TCCB TIDAL flag is set to zero, then the TCCB address field 922 directly addresses the TCCB. The TCCB TIDAL flag allows the operating system software or the hyper-visor to layer function and prefix user channel programs. The eighth bit of the flags field 906 is a TIDAL write flag. In an exemplary embodiment, the TIDAL write flag is set to one when the output-data address field 916 contains an address of a TIDAL. If the TIDAL write flag is set to zero, then the output-data address field 916 contains a data address.

The ninth through twenty-forth bits of the flags field 906 are reserved for future use.

The TCW 900 also includes a TCCB length field 910 which indirectly represents the length of the TCCB and may be utilized to determine the actual length of the TCCB.

The read/write bits 912 in the TCW 900 are utilized to indicate whether data is being read and/or written as a result of executing the TCW 900. In an exemplary embodiment, the read bit in the read/write 912 bits is set to one to indicate that input data is being transferred from an I/O device 112 to system storage (e.g., main memory 102) in the host system 101 as a result of executing the TCW 900. The write bit in the read/write bits 912 is set to one to indicate that output data is being transferred from system storage (e.g., main memory 102) in the host system 101 to an I/O device as a result of executing the TCW 900.

The output-data address field 916 includes the address for the output data (if any). As described previously, the contents of the output-data address field 916 may be an address of a TIDAL for output data (e.g., an indirect address) or the actual address of the output data (e.g., a direct address). The input-data address field 918 includes the address for the input data (if any). As described previously, the contents of the input-data address field 918 may be an address of a TIDAL for input data or the actual address of the input data. In an exemplary embodiment, the output-data address field 916 and the input data address field 918 are implemented as sixty-four bit addresses.

The TCW 900 also includes a transport-status-block address field 920. A portion (e.g., the extended status part) of a completion status in a transport response IU for an I/O operation is stored at this address. The TCCB address field 922 in the TCW 900 includes an address where the TCCB is located in system storage. As described previously, the TCCB is the control block where the DCWs to be executed for the TCW 900 reside. Also as described previously, the contents of the TCCB address field 922 may be an address of a TIDAL for the TCCB or the actual address of the TCCB. In an exemplary embodiment, the transport-status-block address field 920 and the TCCB address field 922 are implemented as sixty-four bit addresses.

The output count field 924 in the TCW 900 indicates the amount of output data to be transferred by the TCW/TCCB for an output operation. In an exemplary embodiment, the output count field 924 specifies the number of bytes in the output storage area designed by the TCW (the output-data address 916) to be transferred. The input count field 926 in the TCW 900 indicates the amount of input data to be transferred by the TCW/TCCB for an input operation. In an exemplary embodiment, the input count field 926 specifies the number of bytes in the output storage area designed by the TCW (the input-data address 918) to be transferred. Several additional fields in the TCW 900 are reserved: reserved field 928, reserved field 930 and reserved field 932. The interrogate-TCW address field 934 contains the address of another TCW and is used by the channel 124 to interrogate that state of an operation under the initiative of a cancel sub-channel I/O instruction.

The TCW depicted in FIG. 9 is one example of how a command word can be configured. Other configurations are possible where additional fields are included and/or fields depicted in FIG. 9 are not included.

Figure 10:
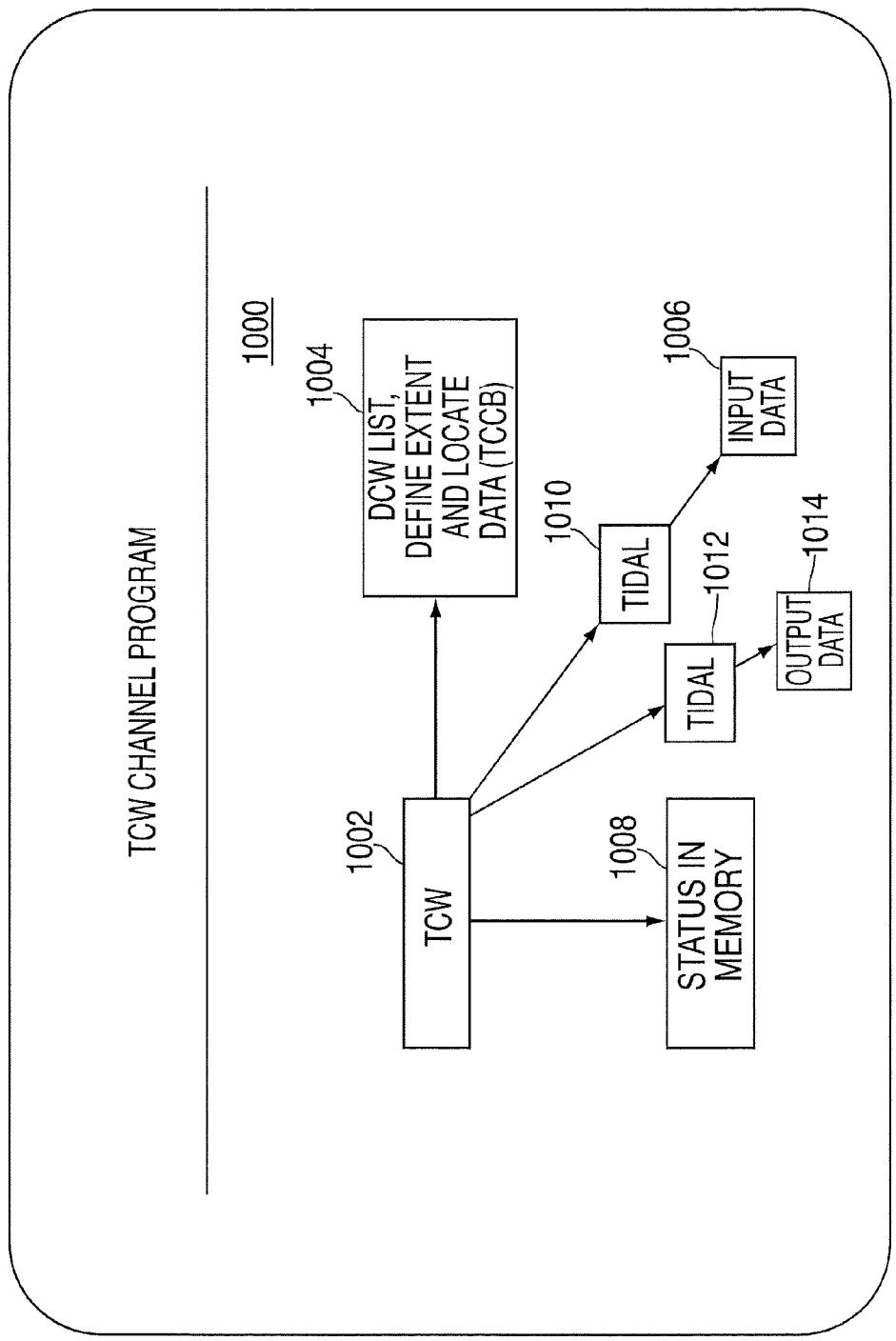
FIG. 10 depicts one embodiment of a TCW channel program, in accordance with an aspect of the present invention.

FIG. 10 depicts one embodiment of a TCW channel program, in accordance with an aspect of the present invention when both input and output data is included in a single I/O operation. As shown in FIG. 10, a TCW channel program 1000 includes a TCW 1002 specifying a location in memory of a TCCB 1004, a location in memory for storing input data 1006 or a TIDAL 1010 (i.e., a list of transport mode indirect data address words (TIDAWs) that points to the location for the input data 1006, a location in memory of an output data area 1014 or a TIDAL 1012 that points to the output data area 1006, and a status area 1008.

Figure 11:
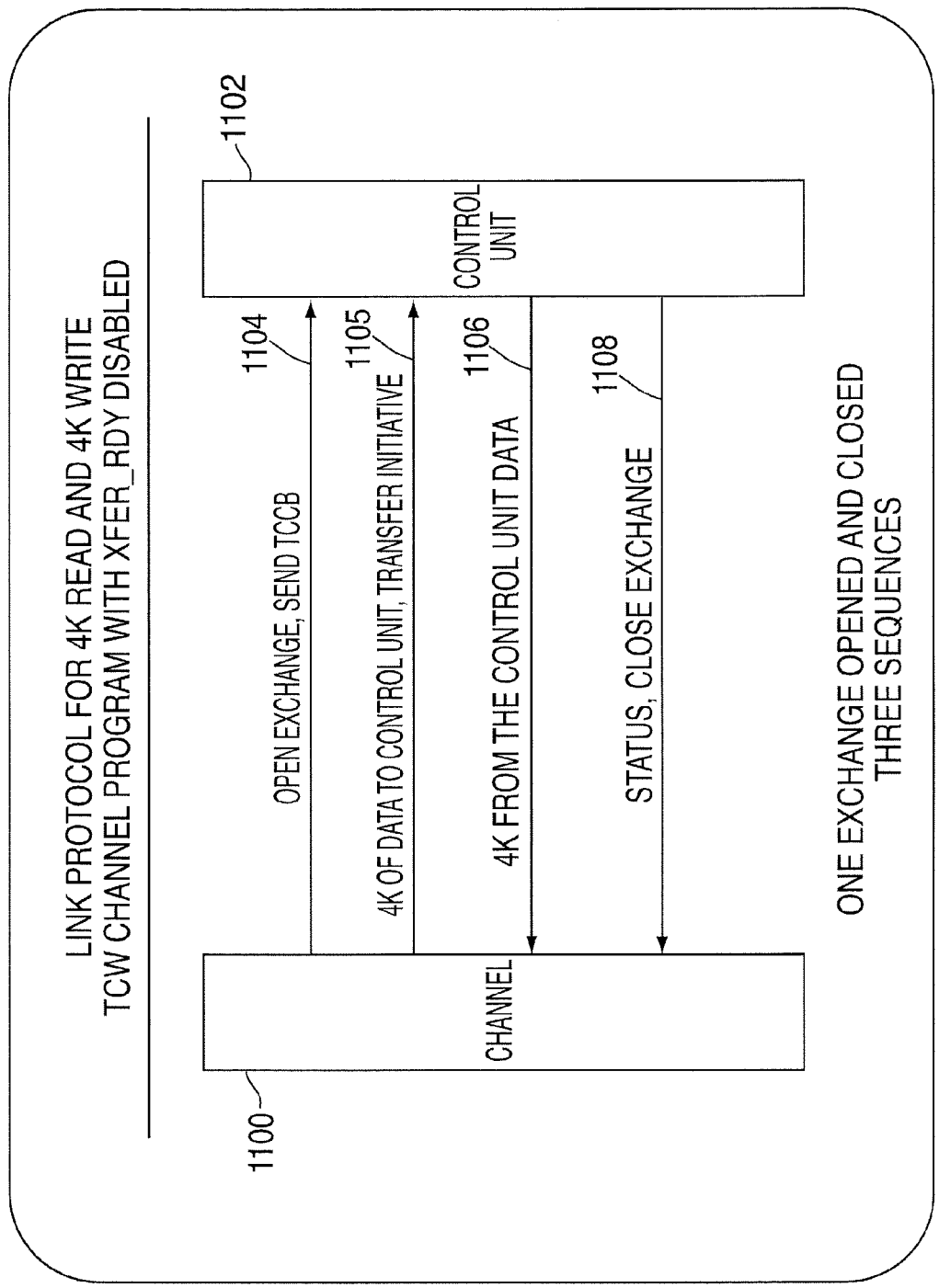
FIG. 11 depicts one embodiment of a link protocol used to communicate between a channel and control unit to execute the TCW channel program of FIG. 10, in accordance with an aspect of the present invention.

The processing of the TCW channel program 1000 depicted in FIG. 10 is described with reference to FIG. 11. Referring to FIG. 11, a channel 1100 opens an exchange with a control unit 1102 and sends a TCCB 1104 and output data 1105 located at the output data area 1014 specified by the TCW 1002 to the control unit 1102. The channel 1100 determines how much data to send based on the value of the output count 924 in the TCW 1002. The control unit 1102 executes the multiple commands of the TCCB 1104 (e.g., define extent command, locate record command, write command and read command as device control words (DCWs)) receives the output data 1105 from the channel 1100 and forwards input data 1106 per the data count in the DCW to the channel 1100 via, for instance, a FCP_Data IU. The channel 1100 stores the input data 1106 at the location specified by the TCW 1002. The control unit 1102 also provides status and closes the exchange 1108. In this manner, data is input to the channel 110 and output to the control unit 1102 in a single TCW channel program 1000 (or I/O operation).

Figure 12:
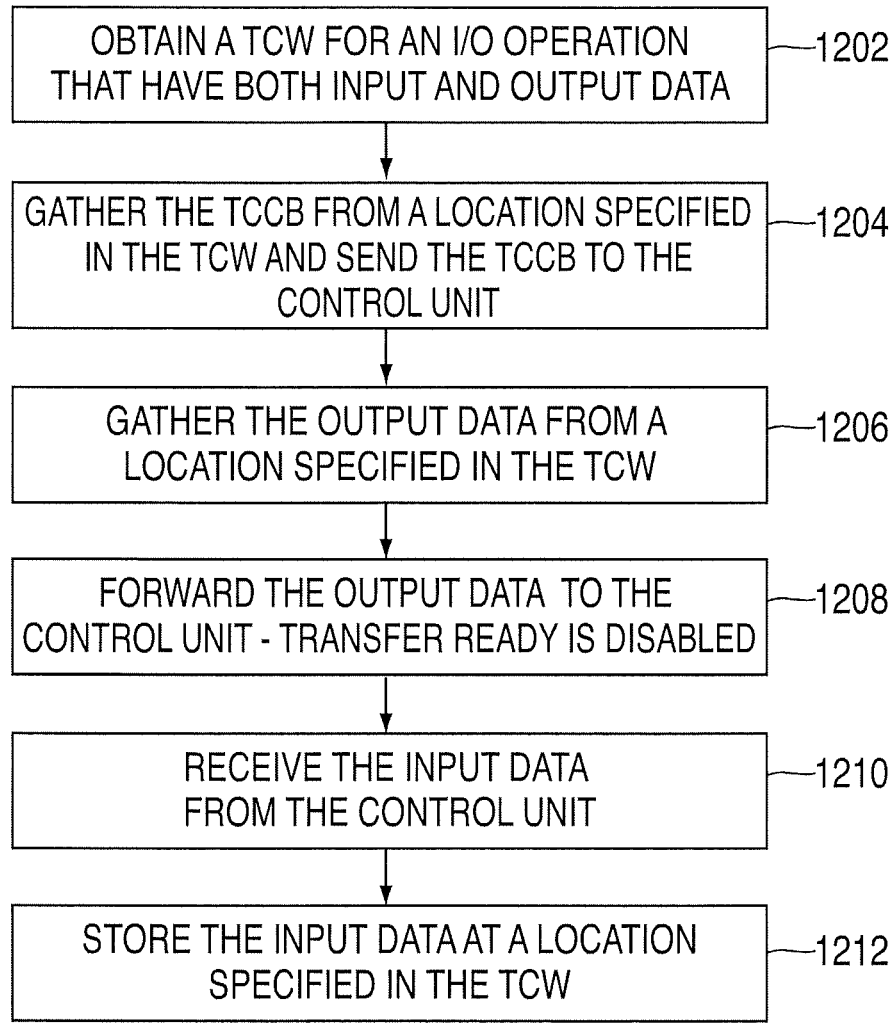
FIG. 12 depicts one embodiment of a process for bi-directional data transfer within a single I/O operation, in accordance with an aspect of the present invention.

FIG. 12 depicts one embodiment of a process for bi-directional data transfer within a single I/O operation, in accordance with an aspect of the present invention. In an exemplary embodiment, the processing depicted in FIG. 12 occurs at a host computer system that is in network communication with a control unit. The host computer system may include an I/O processing system that executes the process. Additionally, the I/O processing system may include a channel subsystem that executes the process. At block 1202, a TCW is obtained by the host computer. In an exemplary embodiment, the TCW is obtained (or received) from an operating system running on the host computer. The TCW includes both an output data address 916 and output count field 924, and an input data address 918 and input data count field 926. In an exemplary embodiment, the TCW includes output data when the write bit in the read/write bits 912 is set to one and the TCW includes input data when the read bit in the read/write bits 912 is set to one. At block 1204 the TCCB location specified by the TCW 922 is fetched and forwarded to the control unit. The TCCB contains the DCWs that inform the control unit what I/O operations to execute.

At block 1206, the output data is gathered from the location specified by the TCW (if the write bit in the read/write bits 912 is set to one). The amount of data gathered to be included in the output data is based on the value of the output data count field 924. As described previously, the output data address may be a direct address of the output data or an indirect address of the output data. An indirect address refers to an address containing a list of one or more addresses (e.g., a TIDAL) that point to a plurality of storage locations that collectively make up the output data. A direct address refers to an address containing the output data. In an exemplary embodiment, the TIDAL write flag in the flags field 906 in the TCW is set to one when the output-data address field 916 contains an address of a TIDAL, and set to zero when the output-data address field 916 contains the address of the output data.

At block 1208, the output data is forwarded to the control unit. For this example XFER_RDY is disabled.

At block 1210, input data is received from the control unit as a result of executing the I/O operation. At block 1212, the input data is stored at the location specified by the TCW (the input-data address 918). In an exemplary embodiment, the TCW includes input data when the read bit in the read/write bits 912 is set to one. As described previously, the input data-address 918 may be a direct address for storing the input data, or alternatively it may be an address to a list of addresses (e.g., a TIDAL or indirect address) that point to a plurality of storage locations, each storing portions of the input data. In an exemplary embodiment, the TIDAL read flag in the flags field 906 in the TCW is set to one when the input-data address field 918 contains an address of a TIDAL, and set to zero when the input-data address field 918 contains the address of the input data.

Technical effects of exemplary embodiments include the ability to include both input and output data in a single I/O operation. This provides flexibility in grouping DCWs and may lead to a decrease in the number of exchanges required between a channel and a control unit.

Figure 13:
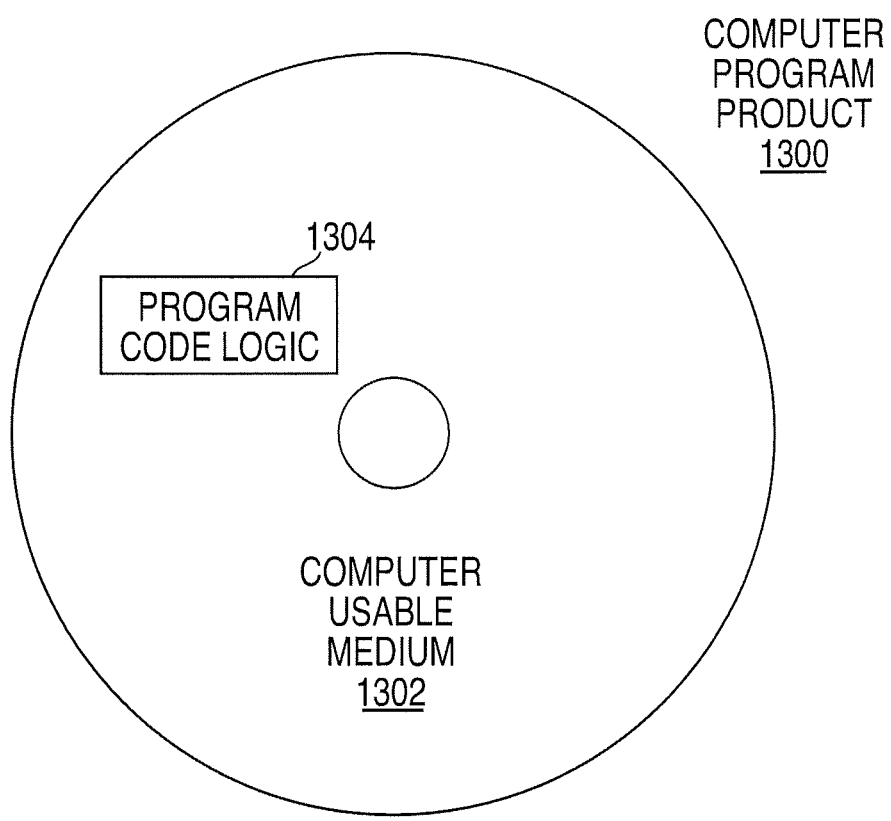
FIG. 13 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 1300 as depicted in FIG. 13 on a computer usable medium 1302 with computer program code logic 1304 containing instructions embodied in tangible media as an article of manufacture. Exemplary articles of manufacture for computer usable medium 1302 may include floppy diskettes, CD-ROMs, hard drives, universal serial bus (USB) flash drives, or any other computer-readable storage medium, wherein, when the computer program code logic 1304 is loaded into and executed by a computer, the computer becomes an apparatus for practicing the invention. Embodiments include computer program code logic 1304, for example, whether stored in a storage medium, loaded into and/or executed by a computer, or transmitted over some transmission medium, such as over electrical wiring or cabling, through fiber optics, or via electromagnetic radiation, wherein, when the computer program code logic 1304 is loaded into and executed by a computer, the computer becomes an apparatus for practicing the invention. When implemented on a general-purpose microprocessor, the computer program code logic 1304 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for facilitating input/output (I/O) processing for an I/O operation at a host computer system configured for communication with a control unit, the host computer system including a memory associated with an operating system, the host computer system including a channel subsystem, the computer program product comprising:
    a tangible storage medium readable by a processing circuit and storing instructions for execution by the processing circuit for performing a method comprising:
    forwarding, by the channel subsystem, a command block including at least one input command and at least one output command specified by a transport command word (TCW) and associated with the I/O operation to the control unit for execution, the I/O operation having both input and output data and associated with the TCW specifying a location in the memory of the output data and a location in the memory for storing the input data, the channel subsystem configured to address the memory;
    gathering output data from a location of the output data specified by the TCW;
    forwarding the output data to the control unit for use in the execution of the I/O operation;
    receiving input data from the control unit; and
    storing the input data at a location specified by the TCW for storing the input data.

2. The computer program product of claim 1 wherein the TCW further specifies a size of the output data, and the gathering the output data is further responsive to the size of the output data.

3. The computer program product of claim 1 wherein the I/O operation includes one or more commands to be executed by the I/O operation.

4. The computer program product of claim 1 wherein one or both of the location of the output data and the location for storing the input data are direct addresses.

5. The computer program product of claim 1 wherein one or both of the location of the output data and the location for storing the input data are indirect addresses.

6. The computer program product of claim 1 wherein the host computer system includes an I/O processing system and the method is performed by the I/O processing system.

7. The computer program product of claim 1 wherein the host computer system includes a channel subsystem and the method is performed by the channel subsystem.

8. The computer program product of claim 1 wherein the TCW is obtained from a host operating system.

9. An apparatus for providing bi-directional data transfer within a single I/O operation, comprising:
    a host computer system including a memory associated with an operating system, the host computer system including a host computer I/O subsystem, the host computer I/O subsystem comprising a channel adapter, the channel adapter configured to communicate with a control unit, the host I/O subsystem configured to address the memory and perform a method comprising:
    forwarding a command block including at least one input command and at least one output command specified by a transport command word (TWC) and associated with the I/O operation to the control unit for excution;
    gathering output data from a location in the memory of the output data specified by the TCW for the I/O operation having both input and output data, the TCW specifying the location of the output data and a location in the memory for storing the input data;
    forwarding the I/O operation and the output data and to the control unit for execution;
    receiving input data from the control unit; and storing the input data at a location specified by the TCW for storing the input data.

10. The apparatus of claim 9 wherein the TCW further specifies a size of the output data, and the gathering the output data is further responsive to the size of the output data.

11. The apparatus of claim 9 wherein the I/O operation includes one or more commands to be executed by the I/O operation.

12. The apparatus of claim 9 wherein one or both of the location of the output data and the location for storing the input data are direct addresses.

13. The apparatus of claim 9 wherein one or both of the location of the output data and the location for storing the input data are indirect addresses.

14. The apparatus of claim 9 wherein the TCW is obtained from a host operating system.

15. A method for facilitating I/O processing for an I/O operation at a host computer system configured for communication with a control unit, the host computer system including a memory associated with an operating system, the host computer system including a channel subsystem, the method comprising:
forwarding, by the channel cubsystem, a command block including at least one input command and at least one output command specified by a transport command word (TCW) and associated with the I/O operation to the control unit for exercution;
gathering, by the channel subsystem, output data from a location in the memory of the output data specified by the TCW for the I/O operation having both input and output data, the TCW specifying the location of the output data and a location for storing the input data, the channel subsystem configured to address the memory;
forwarding the I/O operation and the output data to the control unit for execution;
receiving input data from the control unit; and
storing the input data at a location in the memory specified by the TCW for storing the input data.

16. The method of claim 15 wherein the TCW further specifies a size of the output data, and the gathering the output data is further responsive to the size of the output data.

17. The method of claim 15 wherein the I/O operation includes one or more commands to be executed by the I/O operation.

18. The method of claim 15 wherein one or both of the location of the output data and the location for storing the input data are direct addresses.

19. The method of claim 15 wherein one or both of the location of the output data and the location for storing the input data are indirect addresses.

20. The method of claim 15 wherein the host computer system includes an I/O processing system and the method is performed by the I/O processing system.

21. The method of claim 15 wherein the host computer system includes a channel subsystem and the method is performed by the channel subsystem.

22. The method of claim 15 wherein the TCW is obtained from a host operating system.

23. The computer program product of claim 1, wherein the method further comprises:
obtaining the I/O operation by the host computer system from a location in memory specified by the TCW;
opening an exchange with the control unit; and
performing the forwarding and receiving steps in the opened exchange; and
closing the opened exchange responsive to receiving, with the input data, a close exchange indication from the control unit.

24. The computer program product of claim 23, wherein the exchange is a mechanism for transferring information between the channel and the control unit, the exchange being opened and used only for information transfers associated with the I/O operation specified in the TCW.

25. The computer program product of claim 1, wherein the TCW specifies a location in memory of a transport command control block (TCCB) configured to hold a plurality of commands for performing the I/O operation, and forwarding the I/O operation includes sending the TCCB to the control unit.

26. The computer program product of claim 1, wherein the TCW includes an output-address field configured to specify the location of the output data, an output count field configured to indicate an amount of the output data, an input-address field configured to specify the location for storing the input data, and an input count field configured to indicate an amount of the input data.

27. The apparatus of claim 9, wherein the method further comprises:
obtaining the I/O operation by the host computer system from a location in memory specified by the TCW;
opening an exchange with the control unit; and
performing the forwarding and receiving steps in the opened exchange; and
closing the opened exchange responsive to receiving, with the input data, a close exchange indication from the control unit.

28. The apparatus of claim 27, wherein the exchange is a mechanism for transferring information between the channel and the control unit, the exchange being opened and used only for information transfers associated with the I/O operation specified in the TCW.

29. The apparatus of claim 9, wherein the TCW specifies a location in memory of a transport command control block (TCCB) configured to hold a plurality of commands for performing the I/O operation, and forwarding the I/O operation includes sending the TCCB to the control unit.

30. The apparatus of claim 9, wherein the TCW includes an output-address field configured to specify the location of the output data, an output count field configured to indicate an amount of the output data, an input-address field configured to specify the location for storing the input data, and an input count field configured to indicate an amount of the input data.

31. The method of claim 15, further comprising:
obtaining the I/O operation by the host computer system from a location in memory specified by the TCW;
opening an exchange with the control unit; and
performing the forwarding and receiving steps in the opened exchange; and
closing the opened exchange responsive to receiving, with the input data, a close exchange indication from the control unit.

32. The method of claim 31, wherein the exchange is a mechanism for transferring information between the channel and the control unit, the exchange being opened and used only for information transfers associated with the I/O operation specified in the TCW.

33. The method of claim 15, wherein the TCW specifies a location in memory of a transport command control block (TCCB) configured to hold a plurality of commands for performing the I/O operation, and forwarding the I/O operation includes sending the TCCB to the control unit.

34. The method of claim 15, wherein the TCW includes an output-address field configured to specify the location of the output data, an output count field configured to indicate an amount of the output data, an input-address field configured to specify the location for storing the input data, and an input count field configured to indicate an amount of the input data.

35. The computer program product of claim 1, wherein the method further comprises: obtaining the TCW for the I/O operation.

36. The apparatus of claim 9, wherein the host I/O subsystem is configured to further perform: obtaining the TCW for the I/O operation.

37. The method of claim 15, further comprising obtaining the TCW for the I/O operation.

* * * * *